United States Patent
Eto et al.

(10) Patent No.: US 7,333,284 B2
(45) Date of Patent: Feb. 19, 2008

(54) DATA ACCESS CONTROL APPARATUS, DATA ACCESS CONTROL METHOD, CONTROLLER, AND COMPUTER PROGRAM

(75) Inventors: Hiroaki Eto, Kanagawa (JP); Daizo Nagahara, Tokyo (JP); Akihiro Kikuchi, Chiba (JP)

(73) Assignee: Sony Corporation, Tokyo (JP)

( * ) Notice: Subject to any disclaimer, the term of this patent is extended or adjusted under 35 U.S.C. 154(b) by 612 days.

(21) Appl. No.: 10/475,218

(22) PCT Filed: Oct. 10, 2002

(86) PCT No.: PCT/JP02/10543

§ 371 (c)(1),
(2), (4) Date: Oct. 20, 2003

(87) PCT Pub. No.: WO03/071534

PCT Pub. Date: Aug. 28, 2003

(65) Prior Publication Data

US 2004/0148543 A1 Jul. 29, 2004

(30) Foreign Application Priority Data

Feb. 20, 2002 (JP) ............................. 2002-042634

(51) Int. Cl.
*G11B 15/18* (2006.01)
(52) U.S. Cl. ...................................................... 360/71
(58) Field of Classification Search .................... None
See application file for complete search history.

(56) References Cited

U.S. PATENT DOCUMENTS

| | | | | |
|---|---|---|---|---|
| 5,075,805 A | * | 12/1991 | Peddle et al. | 360/61 |
| 5,666,238 A | * | 9/1997 | Igari et al. | 360/77.08 |
| 5,872,800 A | * | 2/1999 | Glover et al. | 714/766 |
| 5,930,225 A | * | 7/1999 | Ishida et al. | 369/275.1 |
| 6,335,843 B2 | * | 1/2002 | Yotsuya et al. | 360/60 |
| 6,449,111 B1 | * | 9/2002 | Kool et al. | 360/48 |
| 7,124,337 B2 | * | 10/2006 | Lambert et al. | 714/723 |

FOREIGN PATENT DOCUMENTS

| | | |
|---|---|---|
| JP | 6-20393 | 1/1994 |
| JP | 7-45004 | 2/1995 |
| JP | 7-220389 | 8/1995 |
| JP | 8-203209 | 8/1996 |
| JP | 8-235793 | 9/1996 |
| JP | 9-185864 | 7/1997 |

(Continued)

*Primary Examiner*—K. Wong
(74) *Attorney, Agent, or Firm*—Oblon, Spivak, McClelland, Maier & Neustadt, P.C.

(57) ABSTRACT

A magnetic head accesses sectors of one track in the order starting with a sector where the magnetic head is put into an on-track state. A seek start timing is reliably determined by accessing on a track by track basis with an uncertain process of a read-ahead operation eliminated. A search time is eliminated by accessing any sector within one track. As a result, the number of seeks is minimized and access time is reduced. A sector format is used to perform an access operation on a track by track basis. In this arrangement, each of seek time and search time is reduced during a random access time and a data transmission speed of a disk drive is assured.

42 Claims, 21 Drawing Sheets

FOREIGN PATENT DOCUMENTS

| | | |
|---|---|---|
| JP | 10-302390 | 11/1998 |
| JP | 11-25592 | 1/1999 |
| JP | 2000-268507 | 9/2000 |
| JP | 2001-189055 | 7/2001 |
| JP | 2001-243095 | 9/2001 |

* cited by examiner

DATA ACCESS CONTROL APPARATUS, DATA ACCESS CONTROL METHOD, CONTROLLER, AND COMPUTER PROGRAM

TECHNICAL FIELD

The present invention relates to a data access control apparatus, a data access control method, a controller and a computer program, for a random-access recording medium and, in particular, to a data access control apparatus, a data access control method, a controller and a computer program, for a disk-type recording medium such as a hard disk which a magnetic head scans to write data to or read data from.

More specifically, the present invention relates to a data access control apparatus, a data access control method, a controller and a computer program for reducing access time to a desired data storage location and, in particular, to a data access control apparatus, a data access control method, a controller and a computer program, free from a delay in a seek startup due to a useless read-ahead operation without resulting in a search time.

BACKGROUND ART

With the advance of information technology such as information processing and information communications, information produced and edited in the past requires reutilization and information storage technology becomes more important. Information recording apparatuses using a variety of media such as a magnetic tape and a magnetic disk have been developed and in widespread use.

Among them, a hard-disk drive (HDD) is an auxiliary storage device of a magnetic recording method. A plurality of magnetic media as a recording medium are housed in a drive unit, and is rotated by a motor at a high speed. The medium is coated with a magnetic material such as iron oxide or cobalt chromium alloy using a plating technique or a thin-film forming technique. A magnetic head radially scans across the surface of the rotating medium and causes a magnetization in response to data on the medium to write the data, or reads the data written on the disk.

The hard disks are already in widespread use. The hard disk as a standard external storage device of a personal computer stores a diversity of computer softwares including an operating system (OS) for starting up the computer and application software programs, or stores reproduced and edited files. The hard disk drive is connected to the computer main unit through an IDE (Integrated Drive Electronics) or a SCSI (Small Computer System Interface), and the storage space of the hard disk is typically managed by a file system, such as an FAT (File Allocation Table), which is a subsystem of the host operating system.

The hard disk drives have currently a large storage capacity. With large storage capacity, the hard disk drive is used not only as a conventional computer auxiliary recording device but also as a hard disk recorder that stores audio-vidual contents broadcast and received. With the application field thereof expanded, the hard disk is used to record a variety of contents.

A physical format method of the hard disk and a data read and write operation of the hard disk, as a computer auxiliary storage device, are now considered.

The hard disk has numerous concentric "tracks" as segments for recording data. For example, track numbers 0, 1, . . . are assigned the outer most track to inner tracks. Generally, the larger the number of tracks on the surface of the hard disk, the larger the storage capacity of the medium.

Each track is divided into "sectors", each sector serving a unit of recording. Standard read and write operations on the disk are performed on a per sector basis. The size of sector is different from medium to medium. The sector of the hard disk has typically a size of 512 bytes. Taking into consideration the utilization of the medium, outer tracks having longer track length have more sectors along to make the recording density on the track substantially uniform. This method is called a "zone bit recording" method.

The zone bit recording provides a substantially uniform recording density on the tracks while resulting in non-uniformity in data transmission speed from track to track (inner tracks presents slower data transmission speeds).

FIG. 26 diagrammatically illustrates the structure of the recording surface of the hard disk. As shown, when the hard disk drive performs an access operation, a seek operation for seeking a next track must also be performed in the case of the longest one track access.

In a hard disk drive having a plurality of media stacked in a coaxial manner, tracks of the same track number of the media are cylindrically arranged, and are thus referred to as a "cylinder." Each cylinder is labeled the same number as the track number. For example, from the outermost side, cylinder 0, cylinder 1, . . . As a result, the track is identified by the cylinder number and a head number corresponding to the medium. A plurality of heads, each interposed between the media, are always integrally driven, moving from cylinder to cylinder.

A CHS mode is available as a method of addressing a target sector. The CHS mode is an addressing method that accesses desired data by designating a PBA (Physical Block Address) on the disk in the order of C (cylinder), H (head), and S (sector).

The CHS method is subject to a limitation in CHS parameters designated by a computer main unit which functions as a host to the hard disk drive. The CHS is unable to cope with a large-capacity hard disk. For this reason, an LBA (Logical Block Address) mode is employed. In this mode, the cylinder number, the head number, and the sector number (CHS) are expressed by a logical serial number LBA. The LBA starts with zero.

When data is read from or written to the medium in the conventional hard disk drive, the magnetic head radially scans across the disk surface to reach the track having a target sector. This action is called a "seek" operation of the magnetic head. To reach the target sector on the track, the media rotate until the target sector comes right beneath the magnetic head. This is called a "search."

As the storage capacity of the disk becomes large, a track density of the disk increases, and a track width becomes narrow. To write data to and read data from the disk with precision, a high positioning accuracy is required of the magnetic head. A servo technique to continuously align the position of the magnetic head at the center of the track is used. A signal called a "servo pattern" is written at regular intervals on each track. The drive checks to see if the magnetic head is aligned at the center of the track (when the magnetic head passes over the servo area present on the data surface of the disk, the signal of the servo pattern is integrated to determine whether the magnetic head is on track). The servo pattern is written onto the hard disk with high precision when the hard disk drive is manufactured. FIG. 27 illustrates the servo area of the track where the servo pattern is written. Written on the servo area are a signal for positioning the head, a cylinder number, a head number, a servo number, etc.

Many conventional hard disk drives are associated with an interface such as an IDE or a SCSI for connection with a computer. In a basic disk drive control, the host computer designates a start address and the number of sectors using a command set defined by the interface.

The hard disk drive accesses sectors starting a sector designated by the address, and then continues accessing while generating a sequence for performing a read-ahead operation by predicting a sector to be accessed later.

The read-ahead operation is based on the assumption that consecutive addresses are assigned a series of data. Typically, consecutive addresses are present in consecutive head numbers or consecutive track numbers.

For example, when a large amount of data such as video data is continuously written on the media, the read-ahead operation effectively works during a read operation.

If the fragmentation of the storage area is very much in progress with a large amount of data fragmented into small pieces of data and dispersed at a plurality of locations, the read-ahead operation is not successful, designating different data during the read operation. Such an unsuccessful read-ahead operation occurs because the hard disk drive side fails to learn the structure of files handled by a host (computer main unit) requesting data read and data write.

If a prediction provided by the read-ahead operation is erroneous because of a new access request from the host, the hard disk drive seeks a track containing an address having requested data present therewithin, and waits subsequent to the completion of tracking until a target address becomes accessible. There, a seek time and a search time occur.

The read-ahead data may be stored as long as the capacity of a data buffer permits. If the prediction is erroneous consecutively or intermittently, unused old data is successively discarded in the order of old data to young data. During the read-ahead operation, the seek operation is not initiated.

The disk is subject to the seek time, the search time, the loss of time due to a delay of seek start as a result of the read-ahead operation, and data missing due to useless read-ahead operation.

The number of revolutions of the disk is increased to reduce the seek time and the search time in the ordinary disk drive. Since there is no regular pattern in the amount and structure of data used in the host such as the computer, improvements by means of the access method are impossible. Such a disk access method presents problems in power consumption and storage capacity.

As disclosed in Japanese Unexamined Patent Application Publication No. 58-33767, the use of a data buffer improves an access operation during a read operation. A read operation starts at a position which is not a start sector to which an access is requested.

As disclosed in a paper entitled "Track-aligned Extents: Matching Access Patterns to Disk Drive Characteristics" authored by Jiri Schindler et. al., Conference on FAST Jan. 28-30, 2002, Monterey, Calif., access improvements are made by allowing a host to access a disk on a track by track basis.

DISCLOSURE OF THE INVENTION

It is an object of the present invention to provide an excellent data access control apparatus, a data access control method, a controller, and a computer program for appropriately reading data from and writing data to a magnetic disk as a medium by allowing the magnetic head to scan the magnetic disk.

It is another object of the present invention to provide an excellent data access control apparatus, a data access control method, a controller, and a computer program for reducing an access time to a desired data storage location.

It is yet another object of the present invention to provide an excellent data access control apparatus, a data access control method, a controller, and a computer program, free from a search time and free from a delay in a seek startup due to a useless read-ahead operation.

It is a further object of the present invention to provide an excellent data access control apparatus, a data access control method, a controller, and a computer program, for reducing a seek time and a search time during a random access by improving a data structure on a disk as a medium and a disk access method.

The present invention has been developed in view of these and other drawbacks. The present invention in a first aspect relates to a data access control apparatus or a data access control method for controlling an access to a disk-type recording medium, which includes a plurality of concentric tracks with each track divided into a plurality of sectors, and includes seek means or a seek step for seeking a target track, and data access means or a data access step for accessing the sectors of the sought track in the order starting with a start sector which becomes accessible on the sought track.

The data access control apparatus or the data access control method in the first aspect of the present invention may be applied to a magnetic disk type recording medium such as a hard disk drive. In this case, the plurality of substantially concentric tracks are provided on the surface of the disk, and each track is divided into a plurality sectors. The magnetic head is radially moved across the rotating disk to seek a target track, and accesses a sector on the track in the direction of rotation.

Conventional hard disk drives must wait in search time until an access requested start sector on the track arrives at the magnetic head. A read-ahead operation is performed to predict a sector to which an access is expected. If a fragmentation is very much in progress on the disk, the read-ahead operation becomes useless.

The data access control apparatus or the data access control method in the first aspect of the present invention accesses the sectors of one track from the sector where the magnetic head is on-track. More specifically, handling one track as a unit of access eliminates an uncertain process of the read-ahead operation, reliably determining the seek start timing. Since an access operation may start with any sector on the track, read and write operations are performed at any head position immediately subsequent to the seek operation. A search time is thus eliminated. The number of seeks is minimized and the access time is reduced.

In the conventional hard disks, a data access operation is performed based on absolute position addresses assigned beforehand the tracks and the sectors. In contrast, the data access control apparatus or the data access control method in the first aspect of the present invention successively allocates relative position addresses to the sectors on the track in the order starting with the start sector where a data access operation has started during a write access.

In accordance with the present invention, a write requesting source (a host apparatus such as a computer connected to the hard disk drive) need not be conscious of a write destination address on the disk. On the other hand, during a read access, data read from the sector on the track may be repositioned in accordance with the relative position addresses on a buffer memory. Regardless of the position of the start sector in the access operation, original data is reconstructed. The storage area of the disk is efficiently utilized by using the relative position addresses that are short in size.

The data access control apparatus or the data access control method in the first aspect of the present invention may further include error correction means or an error correction step for generating an error correction code for error correcting data and of error correcting the data in accordance with the error correction code.

In this arrangement, the relative position address, the data body, and the error correction code which covers the relative position address, the data body, and the error correction code within an error correction range may be written on each sector. Alternatively, the data body, and the error correction code which covers the relative position address, the data body, and the error correction code within an error correction range thereof may be written on each sector.

In the latter case, during a read access, the data read from each sector is error corrected by the error correction means to reproduce the relative position address. The data is then reconstructed based on the reproduced relative position address. By removing the relative position from the write data, the storage area of the disk is efficiently utilized.

Servo areas are arranged at regular intervals on the track of the hard disk. With the servo areas, a servo control is performed to keep the magnetic head aligned at the center of the track.

If the sector has a fixed length, each of several sectors straddles the servo area. In such a case, the data access means or the data access step treats, as an accessible start sector, a sector which is provided without straddling the servo area on the sought track.

If each sector has a variable length, none of the sectors is designed to straddle the servo area. In such a case, the data access means or the data access step treats, as an accessible start sector, a sector which is immediately subsequent to a servo area on the sought track.

The storage area of the disk-type recording medium may be divided into two partitions. In one partition, when the sectors of one track are accessed, the access operation starts at a start sector that becomes accessible. In the other partition, the access operation is performed based on the absolute position addresses of the track and the sector as in the conventional art.

The present invention in a second aspect relates to a data access control apparatus or a data access control method for controlling an access to a disk-type recording medium, which includes a plurality substantially concentric tracks with each track divided into a plurality of sectors, and includes seek means or a seek step for seeking a target track, data access means or a data access step for accessing the sectors on the sought track, determining means or a determining step for determining the relationship between a seek time and a seek distance of the track to be accessed by the data access means or in the data access step, and data write control means or a data write control step for allocating logical block addresses to the sectors during data writing so that the seek time covers a plurality of track seeks within a range that the seek time does not exceed search time taking into consideration the relationship between the seek time and the seek distance.

The data access control apparatus or the data access control method in the second aspect of the present invention allocates the logical block addresses to the sectors so that the seek time covers a plurality of track seeks within a range that the seek time does not exceed search time.

From a servo frame which has undergone the writing of one track, a seek is performed not exceeding mean search time, and that time is referred to as a track skew. When data is written on the disk, the consecutive logical block addresses are repositioned on the disk taking into consideration the track skew. When a continuous access straddling a plurality of tracks is performed, data transmission speed is made uniform.

Japanese Unexamined Patent Application Publication No. 9-185864 discloses a technique in which a skew reducing a search time at an average distance of travel of the head is determined, a recording position is determined based on the skew, and an access request is scheduled. The determination of the track skew may employ a method similar to this.

When the data is written on the disk, the consecutive block addresses are successively allocated to the tracks within a range where the seek time or the track skew does not exceeds a predetermined value. Even if a seek operation is performed to any track, the seek time to the track is made uniformed during a continuous access operation, and the search time is minimized.

The determining means or the determining step for determining the relationship between the seek time and the seek distance may perform a seek operation on a disk drive with the seek distance changing, and measures the seek time thereby determining the relationship between the seek time and the seek distance.

The present invention in a third aspect relates to a data access control apparatus for controlling an access to a disk-type recording medium, which includes a plurality substantially concentric tracks with each track divided into a plurality of sectors, and includes seek means or a seek step for seeking a target track, data access means or a data access step for performing an access operation on the sought track, and data write control means or a data write control step for treating, as an access start sector, a sector immediately subsequent to an on-track servo area during data writing.

In the data access control apparatus or the data access control method in the third aspect of the present invention, the combination of the LBA and the CHS is not singular, and the sector is arranged at an appropriate position taking into consideration the individual difference and the operational status of the disk drive.

When the magnetic head shifts by M tracks to seek a target track from an immediately prior track in a write operation, the physical sector position to start access on the target track is off by a skew with respect to the immediately prior track through the seeking by M tracks. This means that a factor such as the seek distance from the immediately prior track changes a track format during a write.

The present invention in a fourth aspect relates to a data access control apparatus or a data access control method for controlling an access to a disk-type recording medium, which includes a plurality substantially concentric tracks with each track divided into a plurality of sectors, and includes seek means or a seek step for seeking a target track, data access means or a data access step for accessing the sectors of the sought track in the order starting with a start sector which becomes accessible on the sought track, command receiving means or a command receiving step for receiving a write request command, data receiving means or a data receiving step for receiving write data, a cache or a step for temporarily storing the received data, and data write control means or a data write control step for controlling a write operation of writing data onto the recording medium, wherein the data write control means or the data write control step causes the data access means or the data access step to initiate a write access of one track if the area of the data requested to write is continuous from the data stored in the cache, and if an access range exceeds one track.

Since the data access control apparatus and the data access control method in accordance with the present invention performs an access operation on a per track basis, the number of sectors per track is not divisible by the unit of access. A remainder empty area, namely, a "blank area" is caused. Data, such as a still image or an ordinary computer file, which requires no real-time handling, may be stored in the blank area.

If an access requesting a continuous recording to the blank areas, which are not used as consecutive areas, is performed in the data access control apparatus and the data access control method in the fourth aspect of the present invention, the hard disk drive reports to the host that the blank area is usable, and to the host a start logical block address expecting a next access. The hard disk drive thus expects that the next write access starts at the reported track.

The data write control means or the data write control step may write data in response to a second issue of the same write request command if the area of the data requested to write is not continuous from the data stored in the cache. More specifically, if the same write request is performed for the second time, the host is determined to be incompatible with the hard disk drive in the fourth aspect of the present invention, and a data write operation similar to the one performed in the conventional hard disk drive is thus performed.

The data write control means may report to a write requesting source an area expecting a next access if the area of the data requested to write is not continuous from the data stored in the cache and if the write data fails to fall within the area of the data requested to write.

The present invention in a fifth aspect relates to a computer program described to cause a computer system to control an access to a disk-type recording medium, which includes a plurality substantially concentric tracks with each track divided into a plurality of sectors. The computer program includes a seek step for seeking a target track, and an access step for accessing sectors of one track in the order starting with a start sector which becomes accessible on the sought track.

The present invention in a sixth aspect relates to a computer program described to cause a computer system to control an access to a disk-type recording medium, which includes a plurality substantially concentric tracks with each track divided into a plurality of sectors. The computer program includes a seek step of seeking a target track, an access step of accessing the data on the sought track, a determining step of determining the relationship between a seek distance and a seek time of the track, and a data write control step of allocating logical block addresses to the sector during data writing so that the seek time covers a plurality of track seeks within a range that the seek time does not exceed search time taking into consideration the relationship between the seek time and the seek distance.

The present invention in a seventh aspect relates to a computer program described to cause a computer system to control an access to a disk-type recording medium, which includes a plurality substantially concentric tracks with each track divided into a plurality of sectors. The computer program includes a seek step of seeking a target track, an access step of accessing data on the sought track, and a data write control step of treating, as an access start sector, a sector immediately subsequent to an on-track servo area during data writing.

The present invention in an eighth aspect relates to a computer program described to cause a computer system to control an access to a disk-type recording medium, which includes a plurality substantially concentric tracks with each track divided into a plurality of sectors. The computer program includes a command receiving step of receiving a write request command, a data receiving step of receiving write data, a storing step of temporarily storing the received data in a cache, and a data write control step of controlling a write operation of writing data to the recording medium, wherein the data write control step includes starting a write access command for one track if the area of the data requested to write is continuous from the data stored in the cache, and if an access range exceeds one track.

The computer programs in the fifth through eighth aspects of the present invention are computer readable programs described to perform a predetermined process on a computer. More specifically, by installing the computer programs in the fifth through eighth aspects of the present invention in a computer system, the computer system functions in cooperation with the computer programs, thereby providing the same advantages as the data access control apparatus and the data access control method in accordance with the first through fourth aspects of the present invention.

Theses and other objects, features, and advantages of the present invention will become apparent after considering the following description of the embodiments of the present invention and the accompanying drawings.

BEST MODE FOR CARRYING OUT THE INVENTION

The embodiments of the present invention are discussed with reference to the drawings.

A. First Embodiment

Figure 1:
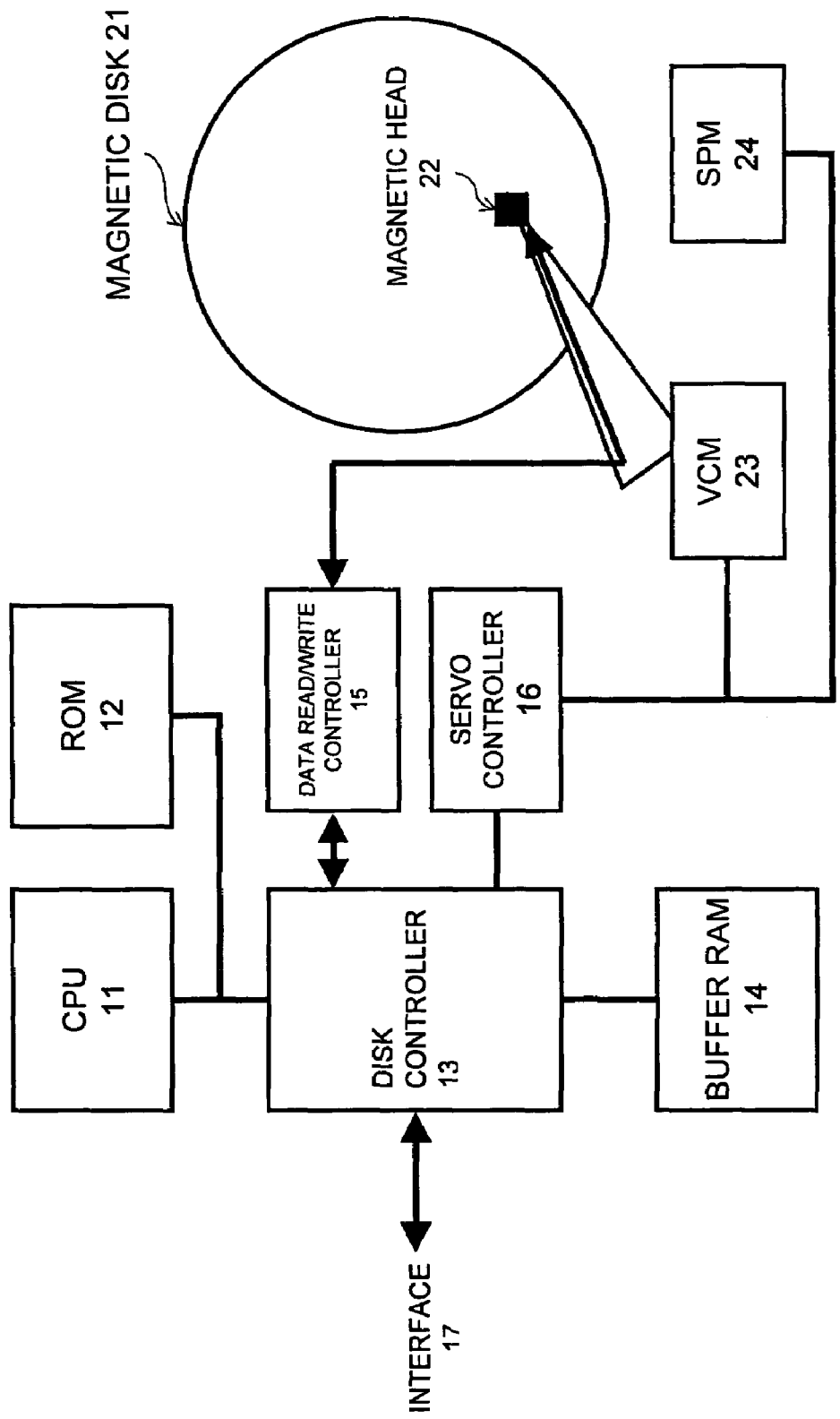
FIG. 1 diagrammatically illustrates the entire structure of a hard disk drive 10 in accordance with one embodiment of the present invention.

FIG. 1 diagrammatically illustrates the entire structure of a hard disk drive 10 in accordance with a first embodiment of the present invention.

As shown, the hard disk drive 10 includes a CPU (Central Processing Unit) 11, a ROM (Read-Only Memory) 12, a disk controller 13, a buffer RAM 14, a data read/write controller 15, and a servo controller 16.

The CPU 11 executes control codes stored in the ROM 12, thereby generally controlling the operation of the drive 10.

The hard disk controller 13 receives commands from a host (not shown) to which the hard disk controller 13 is connected through an interface 17. The CPU 11 processes the commands, thereby instructing hardware such as the data read/write controller 15 and the servo controller 16 to operate accordingly.

Write data received from the host through the interface 17, and data read from a disk 21 and to be handed over to the host are temporarily stored in the buffer RAM 14.

The data read/write controller 15 performs data read and data write operations through a magnetic head 22, which scans across the surface of the magnetic disk 21 as a recording medium, and a modulation process of the write date, and a demodulation process of the read data.

The servo controller 16 drives, in synchronization, a voice coil motor (VCM) 23 for moving an arm bearing the magnetic head 22, and a spindle motor (SPM) 24 for rotating the magnetic disk, thereby controlling the magnetic head 22 to reach a desired area on a target track of the magnetic disk 21. Furthermore, the servo controller 16 places the magnetic head 22 to a predetermined position in accordance with a servo pattern (as already discussed) on the magnetic disk 21 in a seek operation.

A large number of concentric tracks, each being a segment for recording data, is provided on the magnetic disk 21. Track numbers 0, 1, . . . are assigned the tracks of the magnetic disk 21 from the outermost track to the inner tracks. Each track is divided into a plurality of sectors, and one sector is a minimum unit handled in data reading and data writing.

Each sector has a fixed amount of data of 512 bytes. In addition to the body of data, header information and error correction codes are recorded.

The hard disk drive 10 employs a ZBR (Zone Bit Recording) method, in which the number of sectors per circle becomes larger as it is radially away from the center of the disk. More specifically, the number of sectors per track is not uniform over the entire magnetic disk 21, and the magnetic disk 21 is divided into a plurality of zones in a radial direction. The number of sectors remains unchanged in the same zone.

If the zone bit recording method is adopted, the data transmission speed becomes non-uniform from track to track (the data transmission speed becomes lower as the head radially inwardly goes) while the recording density is substantially uniform from track to track.

A plurality of magnetic disks (platters) are stacked along a coaxial axis in the drive unit, although they are not shown. The tracks having the same track number of the magnetic disks (cylinder) are arranged cylindrically, and the cylinder is designated by a cylinder number identical to the corresponding track number.

In the hard disk drive 10 of the present invention, one track access operation starts from a sector with the magnetic head 22 on-track. The sector numbers of the same track are not fixed, and are represented by a relative position. The access operation can start at any sector of the track. More specifically, handling one track as a step of access eliminates the need for performing a process based on an uncertain factor such as a read-ahead operation. The timing of seek start is reliably determined. By performing the access operation from any sector of the one track, a search time is eliminated. The number of seeks is minimized, and the access time is reduced.

To write data onto a predetermined track, a sector is provided with a relative position starting from a sector with which the access operation has started.

To read data, the data is read from the sector with which the access operation has started, and is expanded over the buffer RAM 14 in accordance with the relative position addresses. For this reason, the read operation may start at any sector.

Since the magnetic disk 21 is formatted as described above, the search time is not required. As a result, the access time to the desired sector on the magnetic disk 21 is reduced.

Figure 2:
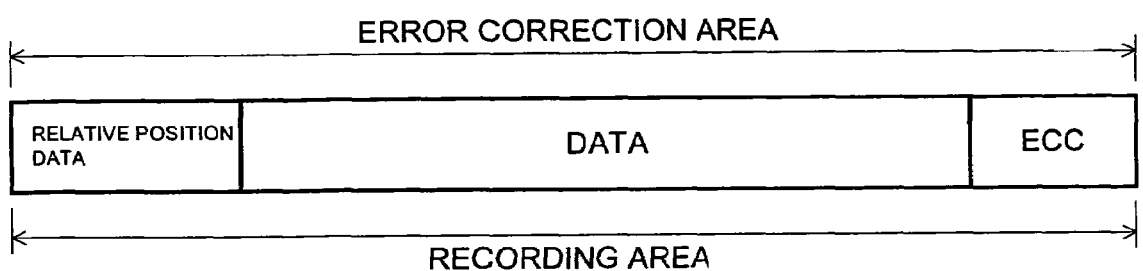
FIG. 2 illustrates an example of a sector format in accordance with one embodiment of the present invention.

FIG. 2 diagrammatically illustrates an example of a sector format used in the magnetic disk 21 in the hard disk drive 10 in accordance with the first embodiment of the present invention.

As shown, each sector includes relative position data representing a relative position of each sector on the track, the body of data, and an ECC (Error Correction Code) for performing an error correction on the entire area of the sector. The entire area is an error correction range and a recording range.

Typically, each sector contains a ID field for recording the address of the sector. The size of the ID field is reduced by recording the relative position rather than the absolute position. The size of the field available to record the data body in the sector is enlarged accordingly, and the storage area of the sector is efficiently utilized.

When data is written onto a track, a relative position from the sector with which the access operation has started is assigned a sector. The relative position and the ECC data from original record data are thus generated. The relative position, the data body, and the ECC data are respectively recorded onto a relative position field, a data field, and an ECC field of the corresponding sector. Since the write operation starts at the sector with the access operation has started, no search is required.

A read operation starts at the sector with which the access operation has started on the track, and based on the sector position acquired from the relative position field, a storage location in the buffer RAM 14 is determined. No matter where a data read operation starts at any sector, the data is repositioned in accordance with the relative position on the buffer RAM 14. The data stored on the track is reconstructed in the original order. Since the read operation starts at the sector with which the access operation has started, there no need for searching for the sector.

Figure 3:
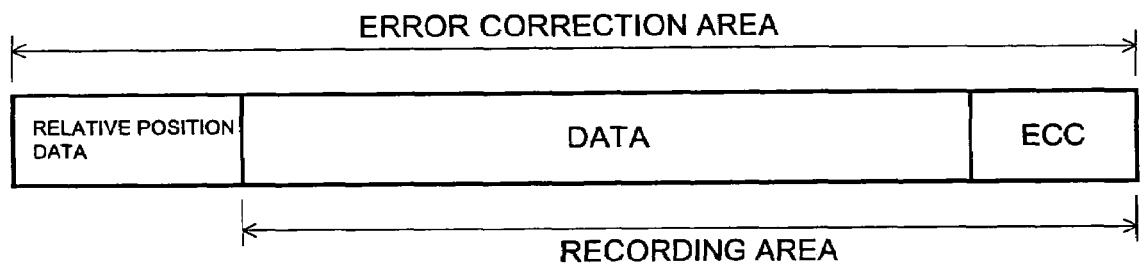
FIG. 3 illustrates another example of the sector format in accordance with one embodiment of the present invention.

FIG. 3 diagrammatically illustrates another example of a sector format used in the magnetic disk 21 in the hard disk drive 10 in accordance with the first embodiment of the present invention.

In this case as well, each sector includes relative position data representing a relative position of each sector on the track, the body of data, and an ECC (Error Correction Code) for performing an error correction on the entire area of the sector. The entire area is an error correction range, but the relative position field is not contained in a recording range unlike the case shown in FIG. 2. With the relative position field excluded, the size of the field available to record the data body in the sector becomes larger than the above-referenced arrangement, and the storage area of the sector is more efficiently utilized.

When data is written onto a track, a relative position from the sector with which the access operation has started is assigned a sector. The relative position and the ECC data from original record data are thus generated. Only both the record data and the ECC data are recording on the sectors. Since the write operation starts at the sector with the access operation has started, no search is required.

A read operation starts at the sector with which the access operation has started on the track, and an error correction is performed using the ECC. The relative position, which has not been written onto the sector, is reproduced. Based on the relative position, a storage location in the buffer RAM 14 is determined. No matter where the read operation starts at any sector, the data stored on the track is reconstructed in the original order on the buffer RAM 14. Since the read operation starts at the sector at which the access operation has started, there no need for searching for the sector.

Figure 4:
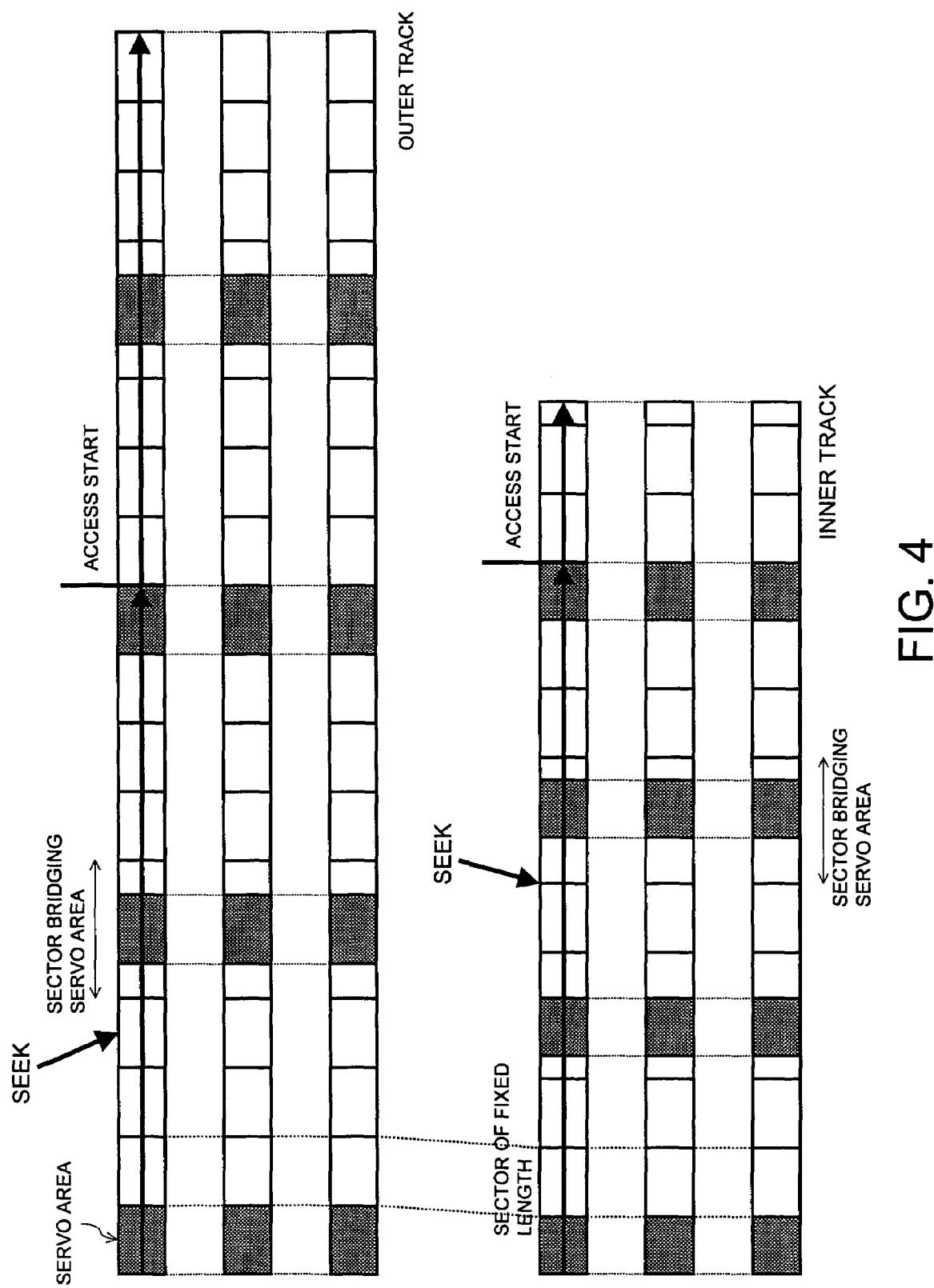
FIG. 4 illustrates one example of a track format using the sector format.

FIG. 4 illustrates one example of a track format using the sector formats show in FIG. 2 and FIG. 3.

Servo areas, each having a servo pattern, are arranged at regular intervals to perform a servo control to keep the magnetic head aligned at the center of the track (as already discussed). When the head passes over the servo area present on the data surface of the disk and a resulting servo pattern signal is integrated, the hard disk drive 10 determines whether or not the head is on-track. Written onto the servo area are a signal for positioning the head, the cylinder number, the head number, the servo number, etc.

In the track format shown in FIG. 4, the sector has a fixed length, and each of several sectors straddles the servo area. An accessible start sector is a first sector recorded without straddling the servo area after a seek operation to a target track is performed.

The hard disk drive 10 of the first embodiment of the present invention accesses one track from the sector where the magnetic head 22 is on-track. More specifically, the access operation is carried out on a per track basis, and where to place the absolute position of the start sector with which the access operation starts on the track is not important. The access operation is performed immediately subsequent to the next servo area to place priority on an access speed.

Figure 5:
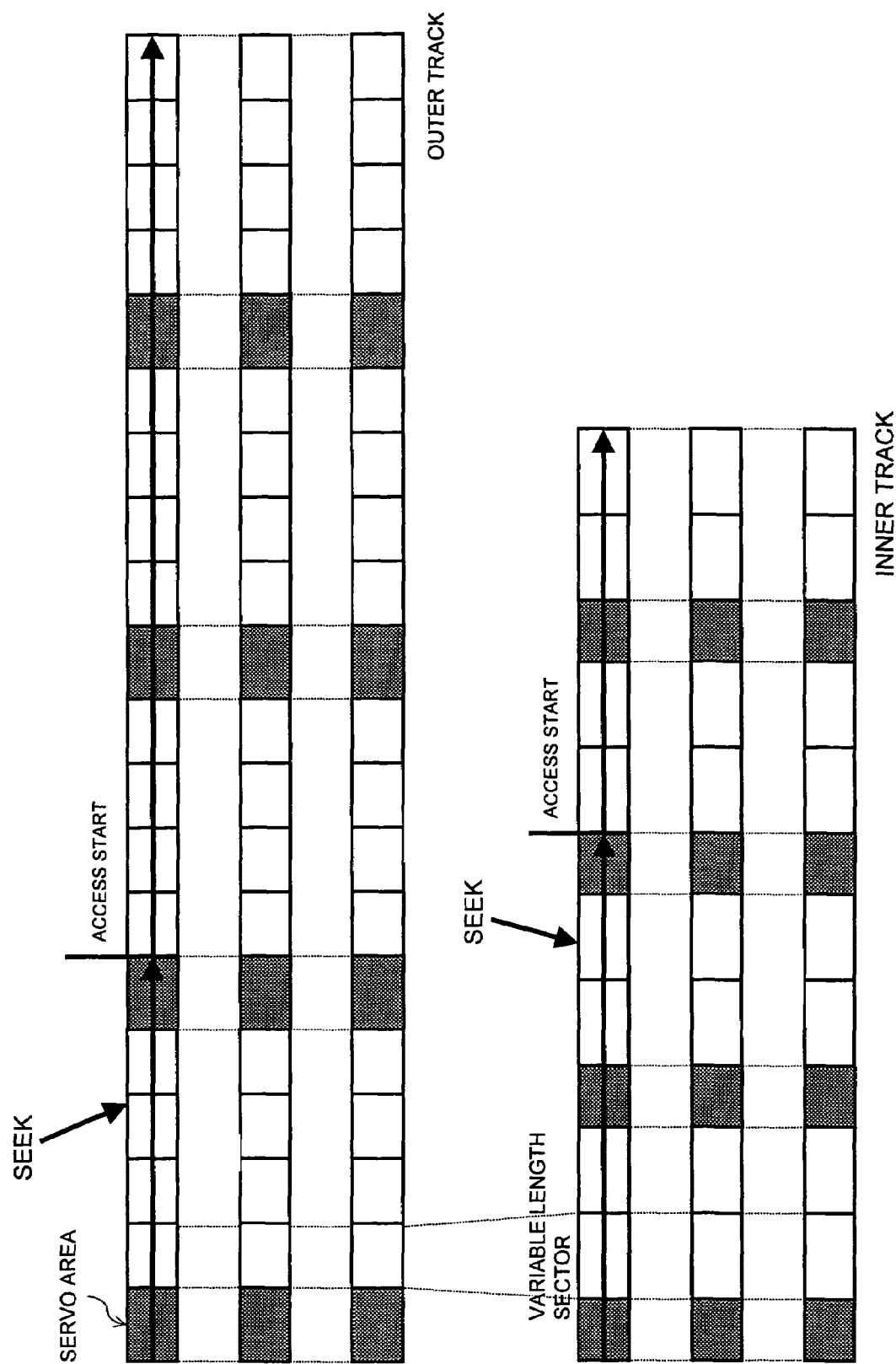
FIG. 5 illustrates another example of the track format using the sector format.

FIG. 5 illustrates another example of the track format using the sector formats illustrated in FIG. 2 and FIG. 3.

As shown, the sector has a variable length in the track format. Each sector is designed not to straddle the servo area. An accessible start sector is a first sector immediately subsequent to the servo area the head has passed after the seek operation to the target track.

Since the on-track timing of the head during the data reading is different from the on-track timing of the head during the data writing (because an on-track detection is broad in response and because the timing changes depending on an access sequence), the read operation cannot be performed in the order according to which the write operation has been performed. To read data at the same timing with any servo area at the beginning, the conditions of all servo areas are preferably equalized. The sector length is thus set to be variable as shown in FIG. 5.

Figure 6:
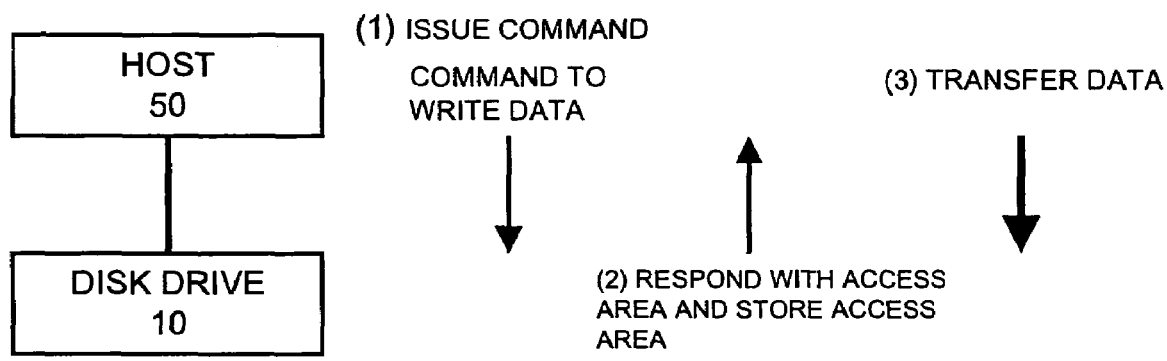
FIG. 6 illustrates a communication example in which data is written in response to a command from a host to which a hard disk drive 10 of one embodiment of the present invention is connected through an interface 17.

FIG. 6 illustrates a communication example in which data is written in response to a command from the host 50 to which the hard disk drive 10 of the first embodiment of the present invention is connected through the interface 17.

The host 50 issues a data write command to the hard disk drive 10. In response, the hard disk drive 10 returns an address area that minimizes the seek time in a current access sequence.

Upon receiving the reply from the hard disk drive 10, the host 50 transfers a data content as large as the designated size of the address area (such as the number of bytes and the number of sectors). The hard disk drive 10 writes the received data content on a track by track basis.

As described above, if the relative position information is allocated to the sectors with reference to the access start sector on the track during the write operation, the host 50 neither need to be conscious of a specific write location such as the cylinder number, the head number, the sector number during the write operation, and nor need to designate these numbers.

The address area the hard disk drive 10 notifies the host 50 of may be as simple as a content number that identifies a content, the writing of which is requested by the host. The hard disk drive 10 prepares a conversion table between the content number and the physical storage location on the magnetic disk 21. Since the disk access is performed on a track by track basis in the first embodiment of the present invention, the conversion table of the content number is shown as below.

TABLE 1

| Content No. | Track No. | Head No. |
|---|---|---|
| 1 | 0-99 | 0 |
| 2 | 100-129 | 0 |
| 3 | 200-249 | 0 |
| 4 | 130-199 | 0 |
| 5 | 300-399 | 0 |
| . | . | . |
| . | . | . |
| . | . | . |
| 9 | 470-499 | 0 |
| Unused | — | — |
| Unused | — | — |
| Unused | — | — |
| . | . | . |
| . | . | . |
| . | . | . |
| Unused | 500-999 | 0 |
| Unused | 0-999 | 1 |

It should be noted that the conversion table does not list the sector number of the CHS method. In the above addressing structure that the relative position information is relatively allocated to the sectors with respect to the access start sector on the track during the writing, the data is repositioned based on the relative position information of the sector during the read operation regardless of the access start sector on the track. It is therefore unnecessary to designate the access start sector in the conversion table.

The conversion table is written onto the buffer RAM 14. The writing of the conversion table is performed under the control of software executed by the hard disk controller 13 or the CPU 11 at the moment the host 50 receives the write data.

Figure 7:
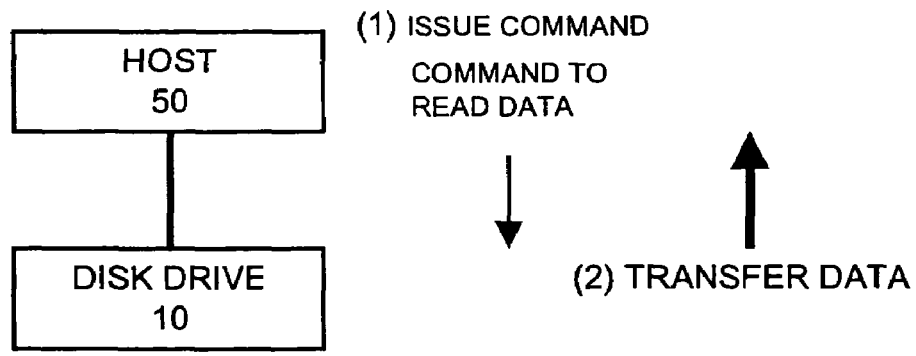
FIG. 7 illustrates a communication example in which data is read in response to a command from a host 50 to which the hard disk drive 10 of one embodiment of the present invention is connected through the interface 17.

FIG. 7 illustrates a communication example in which data is read in response to a command from the host 50 to which the hard disk drive 10 of the first embodiment of the present invention is connected through the interface 17.

The host 50 issues a data read command to the hard disk drive 10. The data read command designates a content number of a target content.

In response, the hard disk drive 10 identifies a target track from the conversion table (see Table 1) in accordance with the content number, and performs a seek operation to the magnetic head 22. The hard disk drive 10 transfers the data on the magnetic disk 21 in accordance with the sequence in the address area corresponding to the data write operation.

During the data read request, the host 50 simply designates a desired content number, and does not need to be conscious of a specific location (PBA) such as a cylinder number, a head number, a sector number, etc.

As described above, the hard disk drive 10 of the first embodiment accesses one track from a sector where the magnetic head 22 is aligned on-tack. Handling one track as a unit of access, an uncertain process of read-ahead is eliminated and the timing of the seek start is reliably determined. Since the access operation may be performed from any sector on the track, the read and write operations are performed from any head position immediately subsequent to the seek operation. The search time is thus eliminated. The number of seeks is minimized, and the access time is reduced.

Such a disk access operation is carried out when the hard disk controller 13 instructs the data read/write controller 15 and the servo controller 16 to operate in hardware operation in response to the command process result provided by the CPU 11, or when the CPU 11 directly instructs the data read/write controller 15 and the servo controller 16 to operate in hardware operation.

Figure 8:
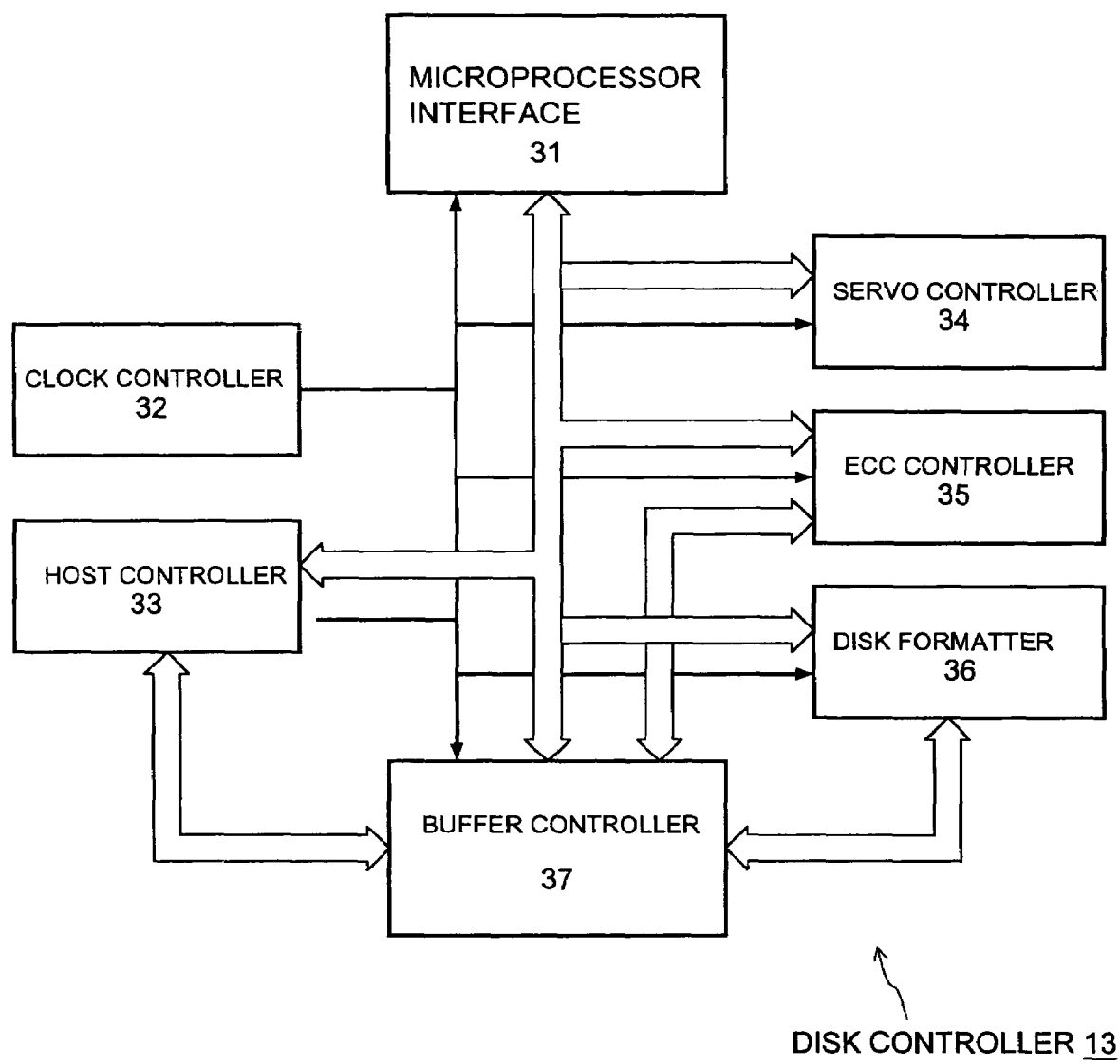
FIG. 8 illustrates an internal structure of a hard disk controller 13.

FIG. 8 illustrates an internal structure of the hard disk controller 13. In response to the command process result provided by the CPU 11, the hard disk controller 13 instructs the data read/write controller 15 and the servo controller 16 to operate in hardware operations.

As shown, the hard disk controller 13 includes a microprocessor interface 31, a clock controller 32, a host controller 33, a servo controller 34, an ECC controller 35, a disk formatter 36, and a buffer controller 37.

The microprocessor interface 31, serving as a connection interface of the CPU 11 and the ROM 12, transfers commands from the host, and receives the command process result from the CPU 11.

The clock controller 32 supplies blocks in the disk controller with operation clocks.

The host controller 33 communicates with the host through the interface 17 which is connected thereto. Upon receiving the write data from the host, the host controller 33 write the conversion table (see table 1). In this embodiment, the address of the access area is not designated by the host.

The servo controller 34 controls the operation of the voice coil motor (VCM) 23 for moving an arm bearing the magnetic head 22, and a spindle coil motor (SPM) 24 which rotates the magnetic disk, thereby reading servo information from a servo pattern on the magnetic disk 21 using the magnetic head 22, and performing servo control in a seek operation to reach a target track.

The ECC controller 35 performs error correction on data (sector data) temporarily stored in the buffer RAM 14. More specifically, when the data is written onto the magnetic disk 21, the ECC controller 35 generates the ECC of the write data and adds the ECC to the write data. When the data is read from the magnetic disk 21, the ECC controller 35 performs error correction using the ECC code attached to the data read from the magnetic disk 21, and reproduces the relative position (refers to the foregoing discussion and FIG. 3). The ECC controller is compatible with any sector length.

The disk formatter 36 successively writes the data of the buffer RAM 14 on the track of the magnetic disk 21, or conversely, reads the data from the track. The access operation to write the data to or read the data from the track is performed on a sector by sector basis in principle.

The buffer controller 37 controls the data exchange of the buffer RAM 14 to other functional blocks. The buffer controller 37 responds to the operation from an unspecified sector position.

The disk formatter 36 in the first embodiment adopts the sector format (see FIG. 2) that contains relative position data indicating a relative position of the sector on the track, the body of data, and the ECC for the entire sector area, or the sector format (see FIG. 3) that contains the body of data and the ECC data for the entire sector containing the relative position of the sector.

In the former sector format, the sectors are provided with the relative position starting with the sector where the access operation has started when the writing operation to the track is performed. The relative position and the ECC data based on the original write data are generated, and are recorded on the relative position field, the data field, and the ECC field. Since the writing starts at the sector where the access operation has started, the search is not required. The read operation starts at the sector where the access operation has started on the target track. The storage location in the buffer RAM 14 is determined based on the sector position acquired from the relative position field. Even if the read operation starts at any sector, the data stored on the track is reproduced in the buffer RAM 14 in the original order. The magnetic head 22 is free from the search because the magnetic head 22 starts at any accessible start sector.

In the latter sector format, the sectors are provided with the relative position starting with the sector where the access operation has started when the writing operation to the track is performed. The relative position and the ECC data based on the original write data are generated, and only both the record data and the ECC data are recorded on the sector. Since the writing starts at the sector where the access operation has started, the search is not required. The read operation starts at the sector where the access operation has started on the target track. The error correction is performed using the ECC, and the relative position not written on to the sector is reproduced. The storage location in the buffer RAM 14 is determined based on the relative position. No matter where the read operation starts at any sector, the data stored on the track is reproduced in the buffer RAM 14 in the original order. The magnetic head 22 is free from the search time because the magnetic head 22 starts at any accessible start sector.

The access operation starts at any sector regardless of whether the sector format shown in FIG. 2 or the sector format shown in FIG. 3 is used. The read and write operations start at any head position immediately subsequent to the seek operation, thereby eliminating the search time.

The disk formatter 36 in the first embodiment may adopt a track format (see FIG. 4) in which the sector has a fixed length with several sectors straddling the servo area, or a track format (see FIG. 5) in which the sector has a variable length with none of the sectors straddling the servo area.

In the former track format, the accessible start sector is a first sector that is recorded without straddling the servo area after the seek operation is performed to a target track. In the latter track format, the accessible start sector is a sector immediately subsequent to the servo area the magnetic head 22 has passed for the first time since the seek operation was performed to the target track. Regardless of any of the two track formats, the disk formatter 36 handles one track as a unit of access. The uncertain process of the read-ahead is eliminated, and the seek start timing is reliably determined.

Figure 9:
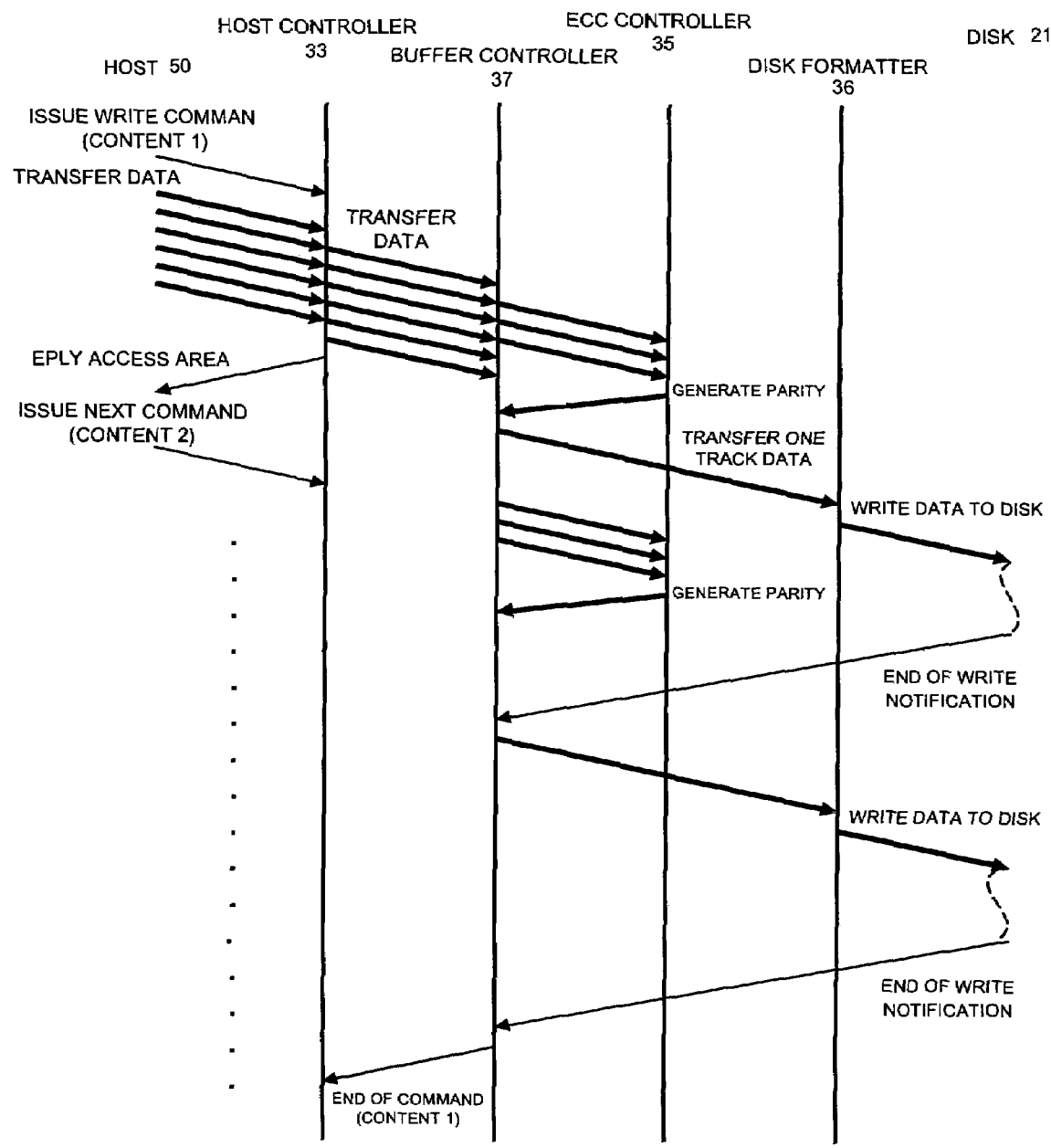
FIG. 9 illustrates an operational sequence of a disk formatter 13 which writes data in the hard disk drive 10 in accordance with one embodiment of the present invention.

FIG. 9 illustrates an operational sequence of the disk formatter 13 which writes data in the hard disk drive 10 in accordance with the first embodiment of the present invention.

The host connected through the interface 17 is now assumed to transfer data subsequent to the issue of a write request command relating to a content 1.

The host controller 33 transfers received data to the buffer controller 37 while writing the conversion table (see Table 1) onto the buffer RAM 14 to answer an access area to the requesting host.

The buffer controller 37 temporarily stores the transferred write data in the buffer RAM 14.

The ECC controller 35 generates a parity of the data temporarily stored in the buffer RAM 14, and rewrites the data onto the buffer RAM 14.

The buffer controller 37 successively reads the write data of one track from the buffer RAM 14, and hands the write data over to the disk formatter 36. The disk formatter 36 writes the data on the sought track on a track by track basis. The search time is not required because the magnetic head 22 starts writing from the accessible start sector on the sought track.

If the write data relating to the content 1 remains in the buffer RAM 14, the ECC controller 35 reads next write data from the buffer RAM 14, generates a parity of the write data, and rewrites the write data to the buffer RAM 14.

When the disk writing of the one track is complete, a write end notice is issued to the buffer controller 37. In response, the buffer controller 37 successively reads the write data of the one track from the buffer RAM 14, and hands the write data to the disk formatter 36. The disk formatter 36 performs the disk write operation on a track by track basis on the sought track (as already discussed). When the disk writing of the one track is complete, a write end notice is issued to the buffer controller 37.

When the process of writing the write data in the buffer RAM 14 is complete, the buffer controller 37 issues a notice to that effect to the host controller 33. The buffer controller 37 updates the disk access state in response to the notice. The host may be notified of the end of the writing through the interface 17.

Figure 10:
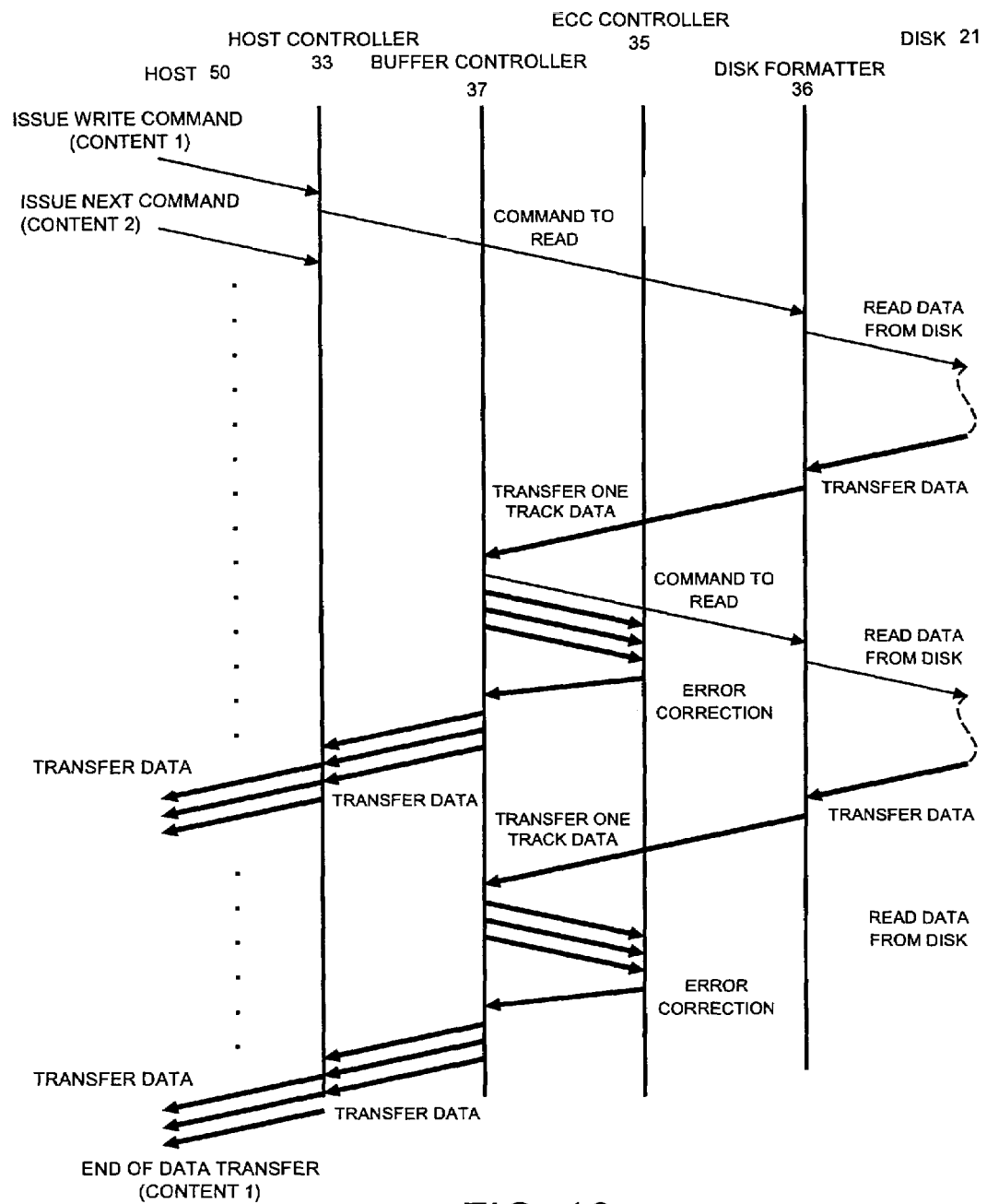
FIG. 10 illustrates an operational sequence of the disk formatter 13 which writes data in the hard disk drive 10 in accordance with one embodiment of the present invention.

FIG. 10 illustrates an operational sequence of the disk formatter 13 which writes data in the hard disk drive 10 in accordance with the first embodiment of the present invention.

The host connected through the interface 17 is now assumed to issue a read request command relating to the content 1.

Upon receiving the read request command, the host controller 33 searches the conversion table (see Table 1), thereby retrieving the track number and the head number of the content requested to read. The host controller 33 instructs the disk formatter 36 to read the data from the corresponding track.

After the magnetic head 22 seeks the designated track, the disk formatter 36 successively reads the data from the sector where the access operation has started on the track. The data reading is performed on a track by track basis. Since the read operation is performed starting with the sector where the access operation has started, no search time is required.

The read data of the one track is transferred to the buffer controller 37. The buffer controller 37 instructs the disk formatter 36 to read a next track.

The buffer controller 37 transfers the received read data to the ECC controller 35 for error correction. When the sector format shown in FIG. 3 is adopted, the relative position of the sector is reproduced through the error correction. The buffer controller 37 expands, in the buffer RAM 14, the data of the sectors in accordance with the relative position, thereby reconstructing the data in the original order thereof.

The host controller 33 acquires the data, expanded and read in the buffer RAM 14, through the buffer controller 37, and transfers the data to the requesting host through the interface 17.

In the first embodiment, the host designates the desired content without being conscious of the address of the seek destination when the host requests the hard disk drive 10 to read the data from or write the data to. The hard disk drive 10 manages the conversion table (see Table 1) that provides the correspondence between the content and the track number, i.e., the seek destination. The track number as the seek destination is acquired by the CPU 11 or the host controller 33.

Figure 11:
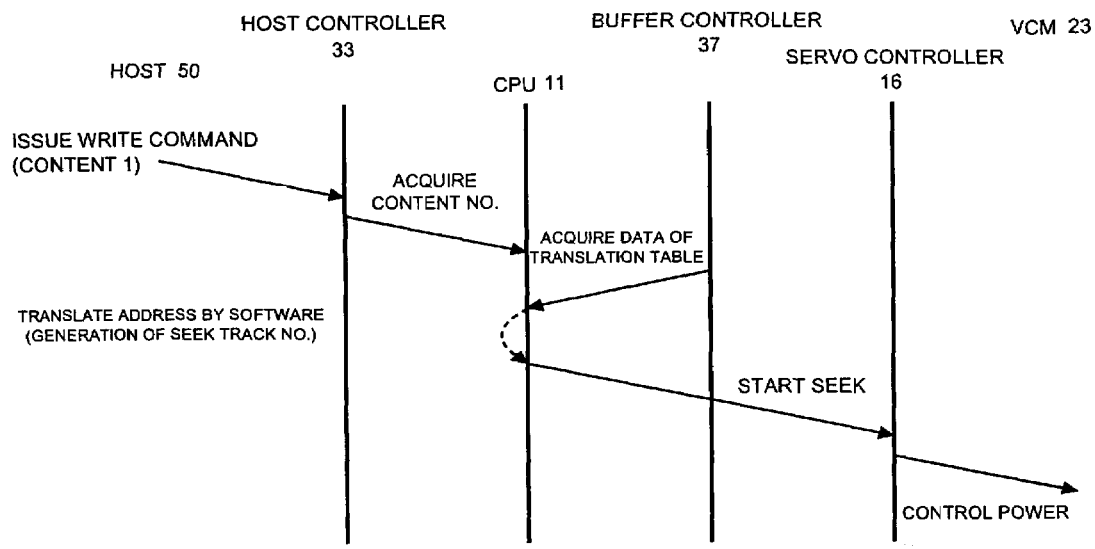
FIG. 11 illustrates an operational sequence of the hard disk drive 10 in read and write operations, in which CPU 11 acquires a track number of a seek destination.

FIG. 11 illustrates an operational sequence of the hard disk drive 10 in read and write operations, in which the CPU 11 acquires the track number of the seek destination.

Upon receiving the read command from the host through the interface 17, the host controller 33 requests the CPU 11 to acquire the content number.

The CPU 11 acquires the data of the conversion table, performing address conversion in software operation, and thereby generating the track number as the seek destination.

The CPU 11 requests the servo controller 16 to start a seek operation. The servo controller 16 controls power to the voice coil motor 23, thereby causing the head to perform the seek operation.

Figure 12:
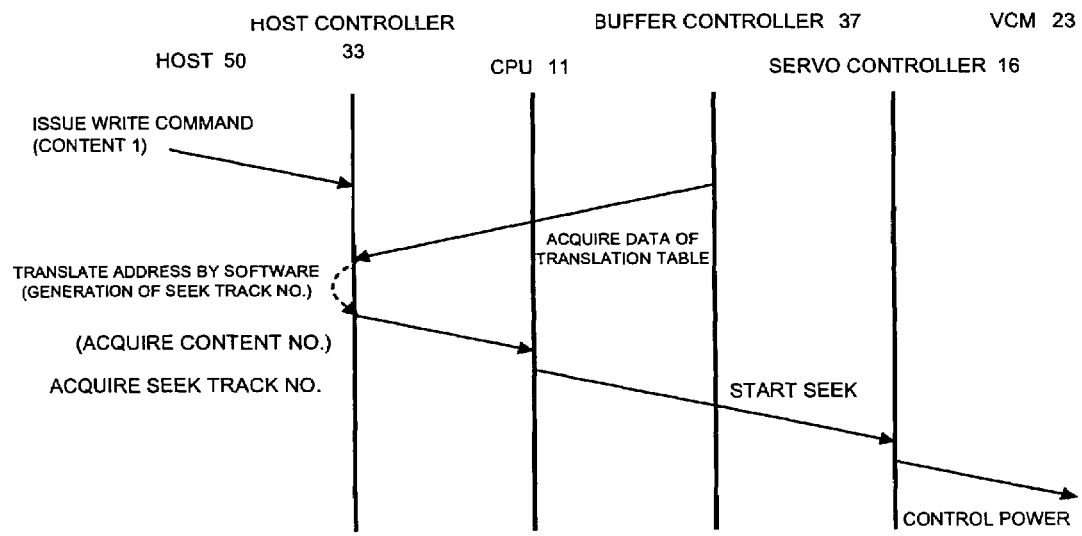
FIG. 12 illustrates an operational sequence of the hard disk drive 10 in read and write operations, in which a host controller 33 acquires a track number of a seek destination.

FIG. 12 illustrates an operational sequence of the hard disk drive 10 in read and write operations, in which the host controller 33 acquires the track number of the seek destination.

Upon receiving the read command from the host through the interface 17, the host controller 33 acquires the content number. The host controller 33 acquires the data of the conversion table from the buffer controller 37, performing the address conversion in hardware operations, and thereby acquiring the track number of the seek destination.

In succession, the host controller 33 requests the servo controller 16 to start a seek operation. The servo controller 16 controls power to the voice coil motor 23, thereby causing the head to perform the seek operation.

Figure 13:
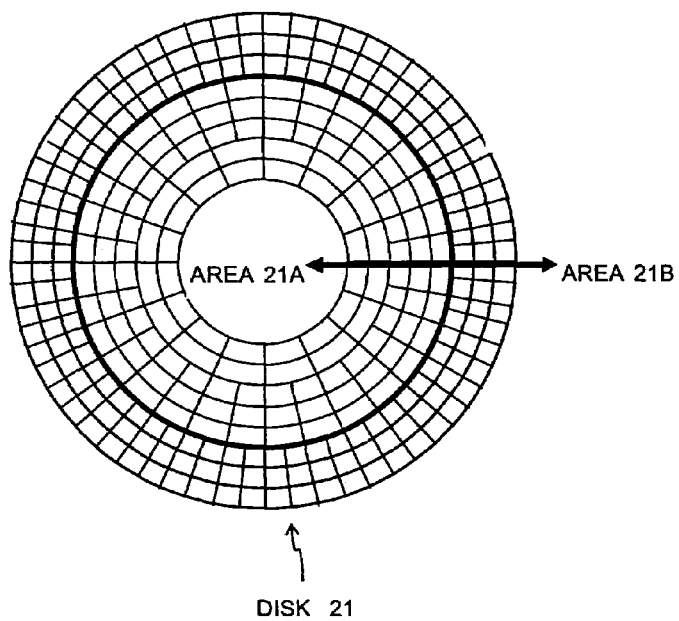
FIG. 13 illustrates partitions of a storage area of a disk, wherein in one partition, the hard disk drive accesses sectors of one track starting with a start sector that becomes accessible, and in the other partition, the hard disk drive accesses sectors based on absolute position addresses of the track and sector as in a conventional manner.

FIG. 13 diagrammatically illustrates the structure of a storage area of the disk in accordance with a modification of the first embodiment of the present invention. As shown, the storage area of the magnetic disk 21 is divided into a first storage area 21A and a second storage area 21B.

In the first storage area 21A, the access operation is performed based on the absolute addresses allocated beforehand, such as the cylinder number (or the track number), the head number, and the sector number (CHS method).

In the second storage area 21B, the relative position addresses are successively allocated to the sectors starting with the sector where the access operation has started on the track during the write access. The access operation starts at the start sector that becomes accessible on the track to access the one track (as already described).

In summary, the magnetic disk 21 shown in FIG. 13 is a hybrid-type hard disk in which the conventional access mode and the access mode of the present invention are mixed. By selectively using the recording areas, data of a large size with respect to the track (such as audio visual contents) and other data (ordinary computer files) are efficiently written to or read from the disk.

B. Second Embodiment

As already described, the hard disk drive 10 of the first embodiment accesses one track starting with the sector where the magnetic head 22 is set to be on-track. More specifically, handling one track as a unit of access eliminates the need for the uncertain process of read-ahead and reliably determines the timing of the seek start. The access operation starts at any sector of one track, thereby eliminating the search time. The number of seeks is minimized, and the access time is reduced.

In the first embodiment of the present invention, the host can instruct the hard disk drive 10 to perform continuous accesses using simple identification information such as the content number identifying the content. In other words, the host does not use a LBA (logical block address) used in a conventional file system in data accessing. The host accesses the disk without being conscious of a logical address space at a sector level such as the LBA. The hard disk drive 10 has difficulty in working with (in assuring compatibility with) a host that uses a conventional file system.

In accordance with the second embodiment, the host accesses the disk using the LBA as in the conventional art. Even when the LBA is used, one track is handled as a unit of access. The access operation starts at the sector where the magnetic head 22 is set to be on-track. In the same way as the first embodiment, the second embodiment is free from the uncertain process of read-ahead, and the timing of the seek start is reliably determined. By accessing any sector of one track, the search is eliminated. The number of seeks is minimized, and the access time is reduced.

B-1. Allocation of the Logical Block Address

When data of a large size, such as video data, is continuously written on the medium, the access to the data is performed on a track by track basis in accordance with the present invention. Continuous access is considered to be effectively performed.

The continuous access refers to a series of accesses to record data according to certain unit (a scene, a chapter, a constant time). The data is arranged using consecutive logical addresses, but the physical location thereof on the disk is not important. During the continuous access, differences in transmission rate with locations on the disk are averaged, and the access operation is performed at a constant transmission rate to the recording medium.

Since the host is not compatible with a large capacity disk in the CSH addressing method, the LBA (Logical Block Address) mode is adopted. Logical serial numbers called LBA starting with 0, such as the cylinder number, the head number, and the sector number, are used (as already discussed).

Figure 28:
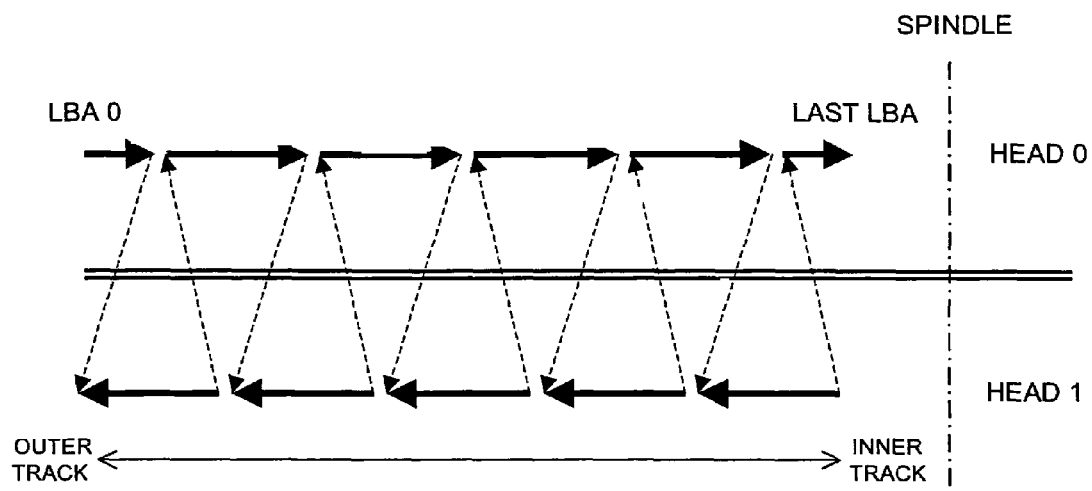
FIG. 28 illustrates a (conventional) allocation method of logical block addresses to the disk from the outermost track to inner tracks.
Figure 29:
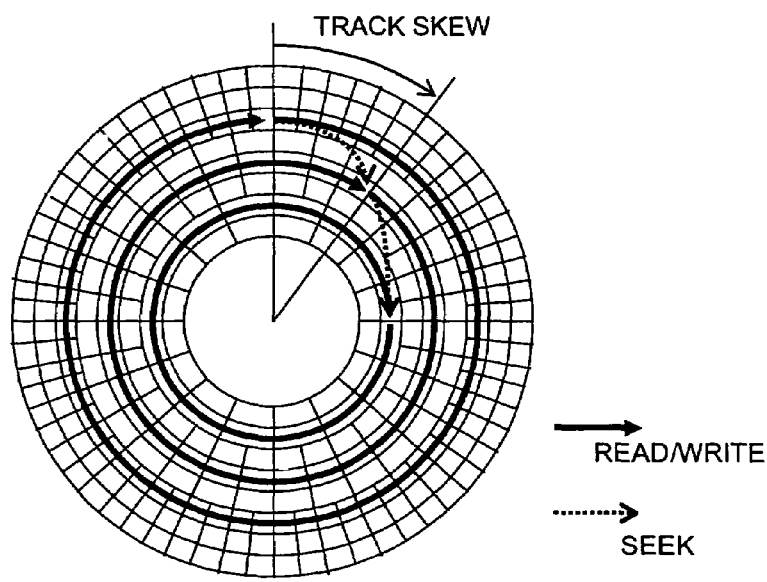
FIG. 29 illustrates a (conventional) operation of continuous access in which the logical block addresses are allocated to the disk from the outermost track to inner tracks.

In ordinary disk drives, the logical block addresses are allocated to the outermost track to inner tracks in the data area of the disk. FIG. 28 illustrates the allocation of the logical block addresses to the tracks from the outermost track to the innermost track (two disks are employed here). FIG. 29 illustrates the operation of the continuous access in which the logical block addresses are allocated to the tracks from the outermost track to the innermost track. As shown, when the read operation or the write operation is completed on a target track, the magnetic head 22 is moved to a track having a continued logical block address in the seek operation. As a result, a track skew corresponding to the seek time occurs.

If the zone bit recording method is adopted to make the recording density on the tracks uniform, the transmission rate is gradually degraded depending on the usage of the disk drive because the host (generally speaking, a file system) tends to use logical block addresses from small to large numbers.

Figure 14:
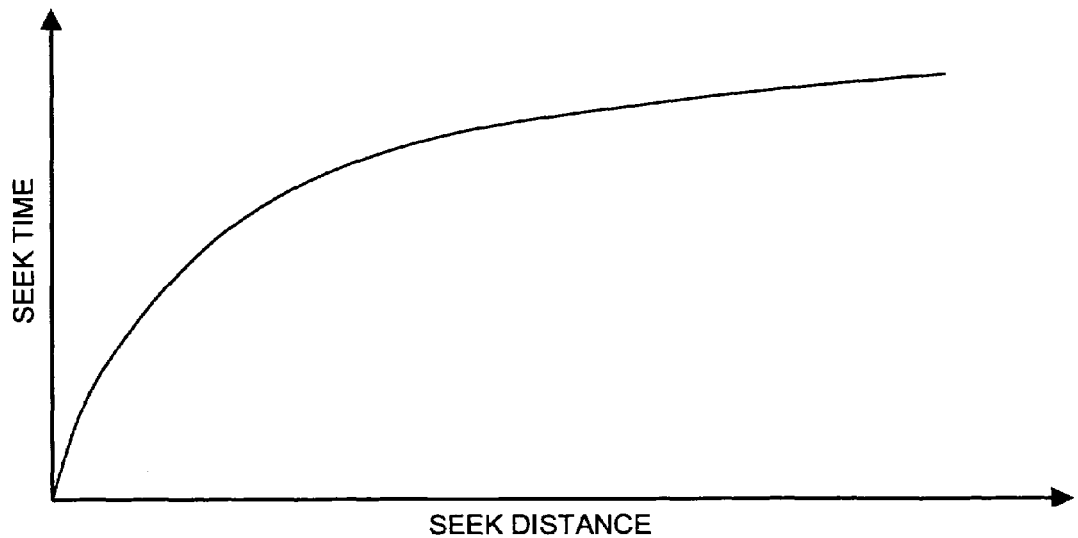
FIG. 14 illustrates the relationship between a seek distance and a seek time.

The seek time for the magnetic head 22 to reach the target track increases with the seek distance. A rate of change in the seek time depends on the seek distance. FIG. 14 illustrates the relationship between the seek distance and the seek time. As shown, the rate of increase in the seek time decreases with the seek distance.

Figure 30:
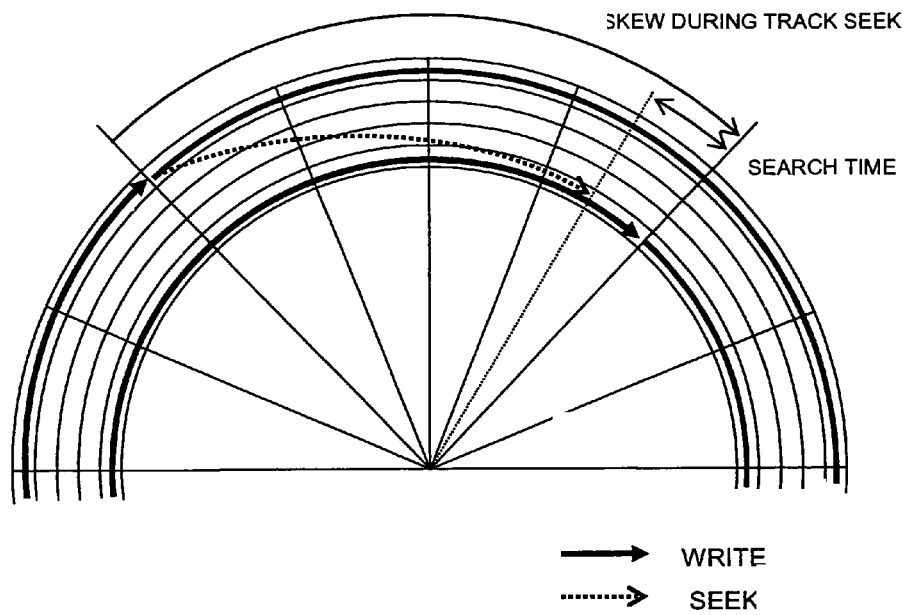
FIG. 30 illustrates the relationship between a skewing and a search time in a four-track seek.

Before accessing a desired data area on the magnetic disk 21, it takes a search time for the magnetic head 22 to arrive right below the target sector subsequent to the seek operation of the magnetic head 22 to the target track. FIG. 30 illustrates the relationship between the skewing and the search time when the magnetic head 22 is shifted by four tracks in the seek operation.

In the second embodiment, the logical block addresses are allocated so that the seek time covers a plurality of tracks of seek as long as the seek time does not exceed the search time. More specifically, the seek operation not exceeding the mean search time is performed from the servo frame that has undergone the write operation of one track, and the time used is referred to as a track skew.

Figure 15:
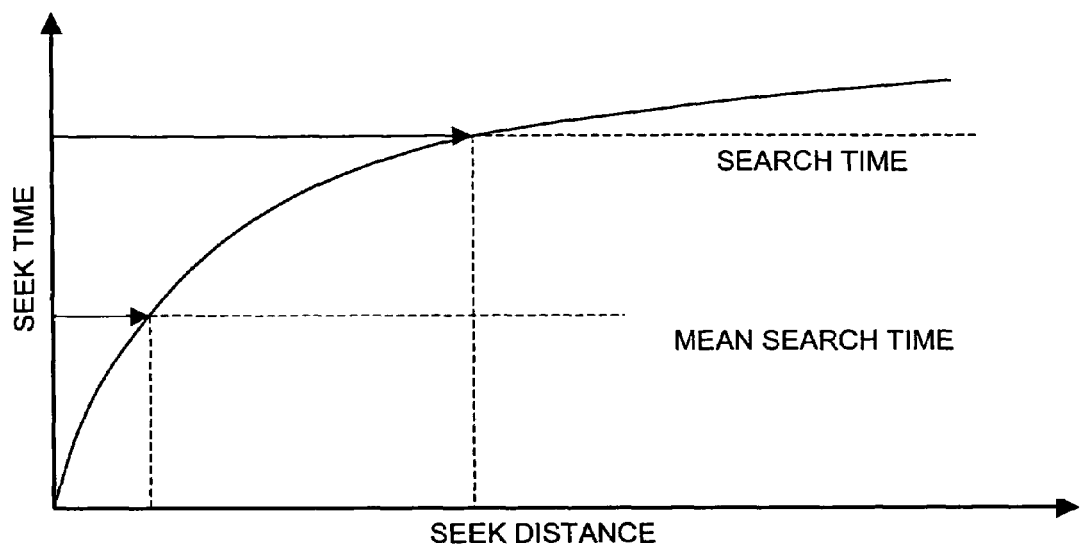
FIG. 15 illustrates the relationship between a seek distance, a seek time, and a search time.

The search time taking into consideration no skew is a reciprocal of the number of revolutions. The mean search time is half the search time. FIG. 15 plots the search time and the mean search time to the graph shown in FIG. 14.

The seek time is measured with the seek operation performed with the seek distance changed in the disk drive. The relationship between the seek distance not exceeding the search time or mean search time and the seek time determined from the seek distance is obtained. Based on the above relationship, the following table is organized in the disk drive. Here, the seek time is represented by the number of servos (skews).

TABLE 2

| | Seek distance (tracks) | | | | | |
|---|---|---|---|---|---|---|
| | 1-3 | 4-8 | 9-20 | 21-50 | 51-80 | 81-150 | 151- |
| Skews (number of servos) | 2 | 4 | 6 | 7 | 8 | 9 | 10 |

When the data is written onto the magnetic disk 21, the consecutive logical block addresses are arranged on the magnetic disk 21 taking int consideration the track skews in Table 2. The data transfer speed is thus made uniform when the continuous access is performed across a plurality of tracks.

Figure 16:
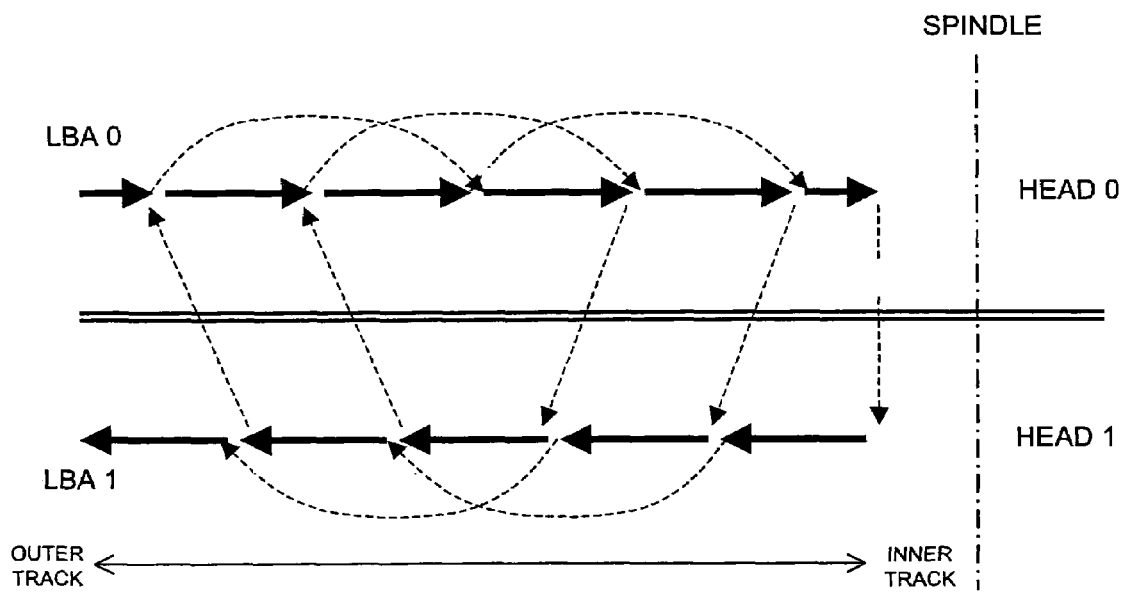
FIG. 16 illustrates the concept of the operation of continuous access wherein the logical block address is allocated in accordance with the present invention.

FIG. 16 illustrates the concept of the operation of continuous access wherein the logical block address is allocated in accordance with the present invention (two disks are employed). As shown, during the write operation, the consecutive logical block addresses are successively allocated to the tracks within a range that the seek time or the track skew does not exceed a predetermined value. If the head is positioned to any track in the seek operation, the seek time to the track during the continuous access is made uniform, and the search time is minimized.

B-2. Generation of the Logical Sector

When the magnetic head 22 passes the servo area presented on the data surface of the magnetic disk 21 in the hard disk drive, whether or not the magnetic head 22 is on-track is determined by integrating the signal from the servo pattern (as already discussed).

The start timing of the read and write operation to the magnetic disk 21 is at the moment the magnetic head 22 passes over the servo area, and the fast access may be achieved by performing the access operation immediately subsequent to the passage of the magnetic head 22 over the servo area. The reading or writing is performed on one track, and the passage of the head over the start servo area means that the magnetic head 22 has traveled by one full track. In response to the signal from the servo pattern, the on-track of the magnetic head 22 may be recognized. The seek to the next target track is performed by one servo earlier by verifying the on-track based on the servo pattern.

Figure 31:
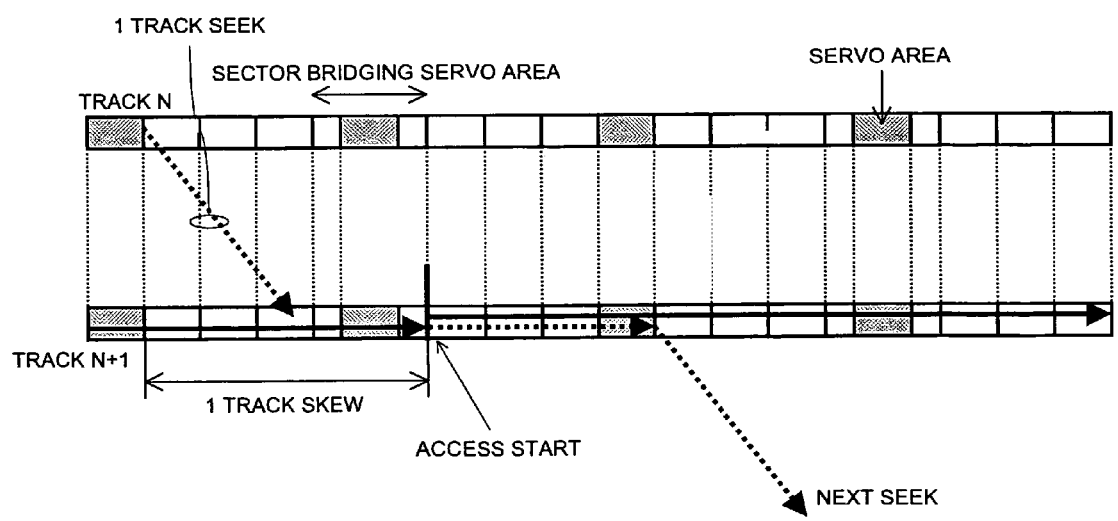
FIG. 31 illustrates an access operation in a conventional one track seek.

FIG. 31 illustrates an access operation in a conventional one track seek. As shown, the start sector of the access is positioned taking into consideration the track skew determined from the seek time. This is fixed in the initialization of the disk drive at the manufacturing phase thereof. After the access to one track, the seek operation is performed to reach a next target track (often a track next to and immediately inside the first track). However, in the writing, the on-track check must be performed at the servo area present ahead of the access end sector. For this reason, one servo delay is caused at the longest.

The sectors on the track have logical block addresses (LBAs) and position information of physical addresses such as CHS (cylinder, head, and sector). In the second embodiment, the combinations of the LBA and the CHS are not singular, and are changed taking into consideration the individual difference and the operational status of the disk drive. A proper sector arrangement is thus achieved.

Figure 17:
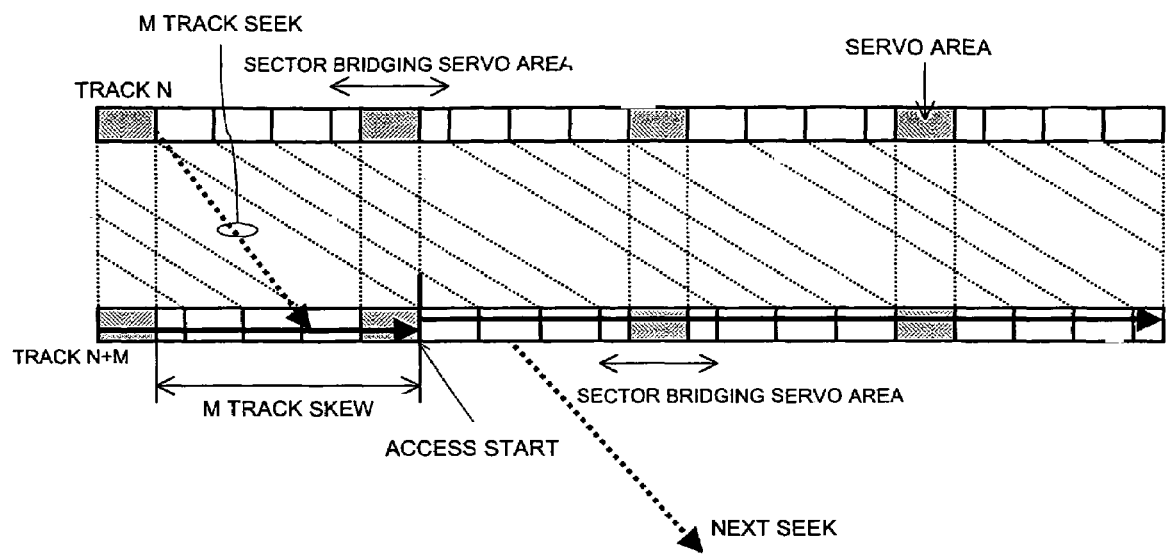
FIG. 17 illustrates an access operation in the seeking of the track in one embodiment of the present invention.

FIG. 17 illustrates an access operation in the seek of the track in the second embodiment of the present invention. As shown, it is assumed that a next target track is present on M tracks ahead after the end of the access to the one track (M is an integer equal to or larger than 1). As already discussed in section B-1, to achieve a uniform data transmission speed in the continuous access, the consecutive logical block addresses are successively allocated on the magnetic disk 21 taking into consideration the track skew. There are times when the next track happens to be located M tracks away rather than immediately inside the first track (see FIG. 16).

Referring to FIG. 17, the access start sector at the next target track is a sector that is placed immediately subsequent to the servo area that becomes on-track. More specifically, this means that the track format changes due to a factor such as the seek distance from the immediately prior track during the writing.

The logical block addresses arranged on the track designate the range of the sector addresses present-on the one track and do not designate the physical position of each sector. The logical block addresses of the track are determined by an endpoint of the track which was accessed immediately before, and the tabled track skew (see Table 2).

Figure 18:
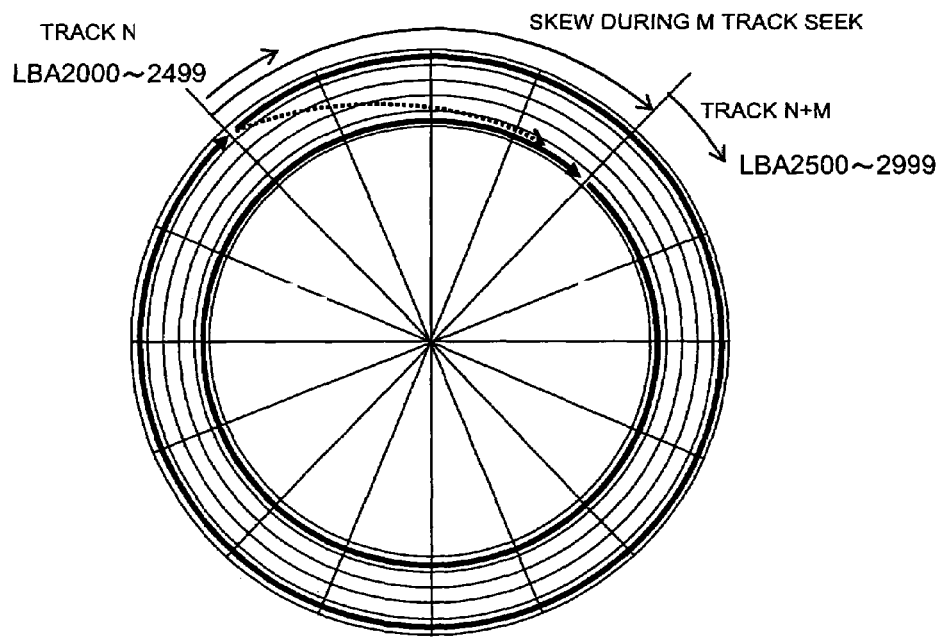
FIG. 18 illustrates a sector range on the track and a start position of a sector address.

FIG. 18 illustrates a sector range on the track and a start position of a sector address wherein the sector arrangement is made on the track in accordance with the present invention.

As shown, logical block addresses 2000 through 2499 are successively arranged along a circle in the track N which was accessed immediately before. The next target track is determined as a track N+M, which is spaced by M tracks, by referencing the tabled track skew (see Table 2).

Logical block addresses 2500 through 2999 are allocated to sectors in the track N+M, and the physical sector position of the start logical address (2500) is a position shifted by a skew during the track seek of the M track.

B-3. Handling the Blank Area

In ordinary file formats, a storage space is managed with reference to the LBA (Logical Block Address). The sectors are handled as a unit by powers of 2 (eighth power, sixteenth power, 64th power to 2, for example).

However, if the access is performed on a track by track basis in the second embodiment of the present invention, there are times when the number of sectors per track is not divisible by the unit of access with a remainder taking place.

An access method to the remainder sectors (hereinafter referred to as a "blank area") will now be discussed.

The number of blank areas per track is the number of sectors per sector minus one. The number of sectors per track is different from zone to zone.

Typical 3.5 inch hard disk drives (of the zone bit recording type) at this writing in 2002 has about 1000 sectors at the outermost track, and about 500 sectors at the innermost track. A maximum of 500 KB blank areas occurs.

Such blank areas correspond to 0.4 second at a rate of 10 Mbps in data such as video data which requires a real-time process. It is advisable that the blank areas are assigned data, such as still pictures or ordinary computer files, requiring no real-time handling.

When an access is made to request a continuous recording on the blank areas that fail to assure consecutive areas, the hard disk drive reports that the blank areas are not usable, and reports a start logical block address on a next track.

B-3-1. Report and Host Process When No Continuous Accesses Can be Made

In response to a write access request from the host, he continuous access is not performed together with the immediately prior write access process with the number of sectors to be processed not exceeding the number of sectors on one track. The process in such a case is performed as below.

If the immediately prior write process is already registered in the cache (the buffer RAM 14), if the write access request from the host has an LBA continuous from a prior one, and if a one-track write process starts together with immediately prior cache data, an continuous access is possible.

If the number of sectors to be processed does not exceed the number of sectors of the one track even with the write access request having the continuous LBA, the write process of the one track cannot be performed by a single cycle. Data already registered in the cache is written, and the remainder becomes an empty area (a blank area).

An area expecting a next access is a sector in another track (track N+M in the following example). By reporting a start LBA to the host, the next access is expected to start with that LBA.

Figure 19:
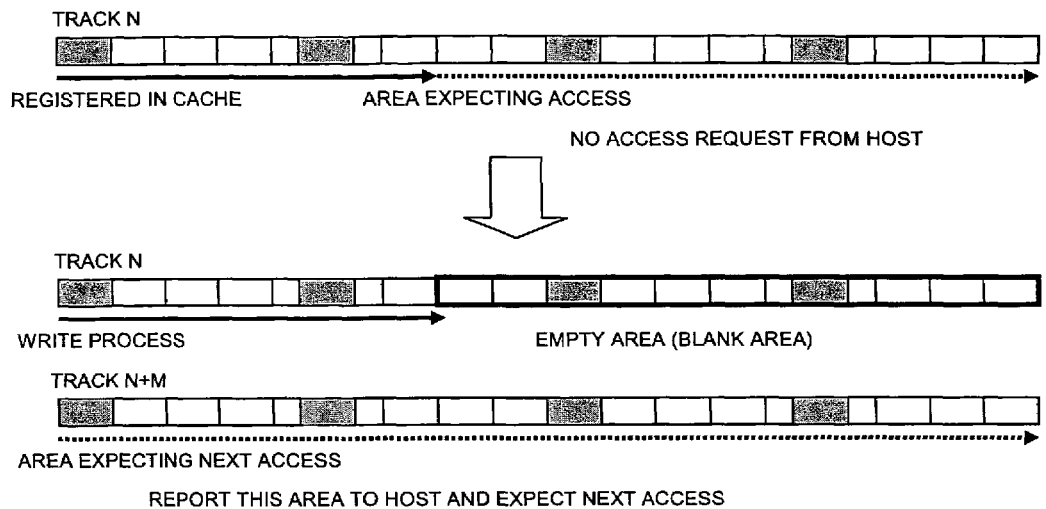
FIG. 19 illustrates a write process performed in response to a write access request not exceeding the number of sectors of one track.

FIG. 19 illustrates a write process performed in response to a write access request not exceeding the number of sectors of one track. As shown, the track N is a track on which a write process is performed.

In the second embodiment of the present invention, the accessing is performed on a track by track basis. The write data is registered in the cache (the buffer RAM 14) until the number of sectors of data requested to write reaches the number of sectors of one track, and the remaining sectors on the track are left as an area expecting an access from now on.

If there is no access request from the host, the area expecting an access becomes a blank area. The file system of the host may register this blank area to place an access request to that area later.

Reported next to the host is another track (track N+M in FIG. 19) as an area expecting a next access. The track N+M expecting an access, subsequent to the track N, is a track having an LBA continuous from the trailing LBA of the track N.

B-3-2. Process in Non-continuous Access

The usage of the blank area is discussed which is generated when no continuous access is performed.

(1) Access Request of Small Data Other than Video Data

When the blank area is registered as an unused area in the file system managed in the host, an access is performed on that area. When a write access request for writing data of a small amount (still pictures or ordinary computer files) other than the video data on the blank area is placed, that request is received, and the process normally ends.

Figure 20:
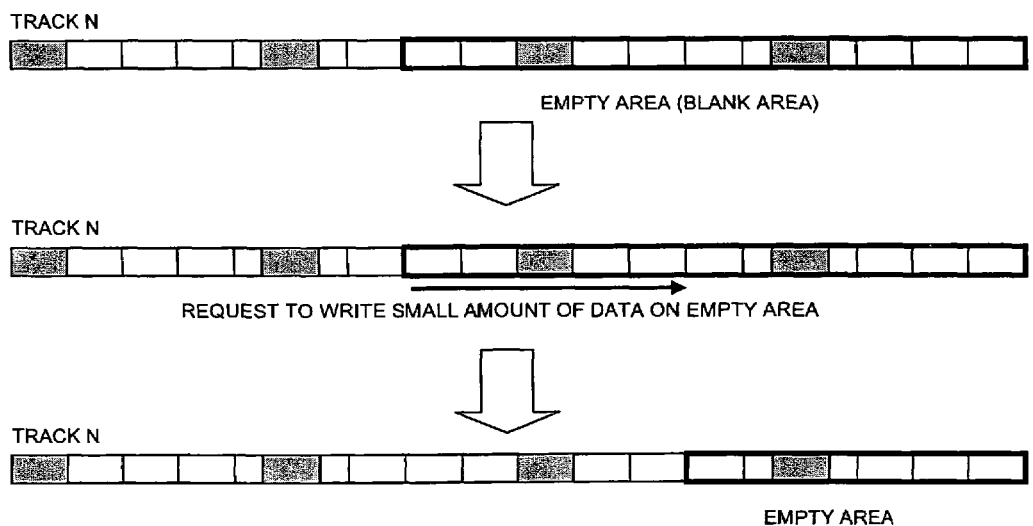
FIG. 20 illustrates a process performed in response to a write access for data of a small amount such as one other than video data wherein a blank area is registered as an unused area in a file system managed by the host.

FIG. 20 illustrates the data write operation to the blank area. The file system in the host manages the unused area on the magnetic disk 21. As shown, the host is assumed to issue the write access request to access the area registered in the file system as a blank area on the track N. Since the data to be written is as small in amount as data other than the video data, the hard disk drive writes the data starting at the beginning of the blank area, and ends the process normally. The blank area remaining subsequent to the write operation is newly registered in the file system of the host.

Figure 21:
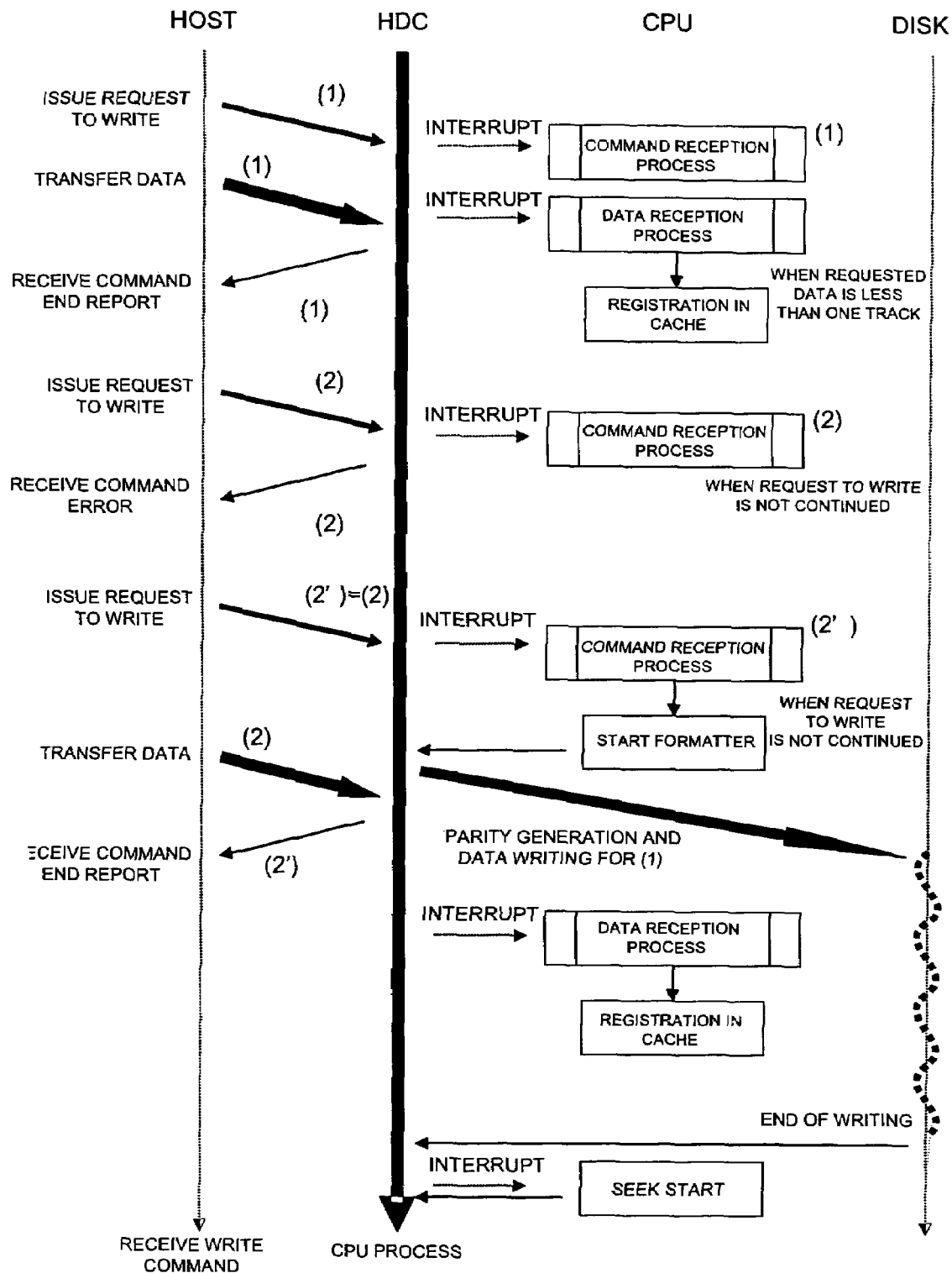
FIG. 21 illustrates a flow of a process performed in response to a write access request for data of a small amount such as one other than video data.

FIG. 21 illustrates a flow of a process performed in response to a write access request for non-continuous data of a small amount such as one other than video data.

When a write access command (1) is issued from the host, the hard disk controller 13 receives the write access command through the interface 17, and interrupts the CPU 11. In response, the CPU 11 performs a command reception process.

When data is then transmitted from the host (2), the hard disk controller 13 receives the data through the interface 17, and interrupts the CPU 11. In response, the CPU 11 performs a data reception process.

When an access to one track is not possible, the write data is stored in the buffer RAM 14 as a cache. The hard disk controller 13 issues a command end report (for normal ending) (1) to the host.

When a next write access command (2) is issued from the host, the hard disk controller 13 receives the next write access command (2) through the interface 17, and interrupts the CPU 11. In response, the CPU 11 performs a command reception process. If the write access request is not continuous (i.e., not continuous from the LBA of the immediately prior write access), the hard disk controller 13 issues a command error report (2) to the host.

In response to the command error report from the hard disk drive, the host issues the write access request (2')=(2). The hard disk controller 13 receives the write the write access request (2') through the interface 17, and interrupts the CPU 11. In response, the CPU 11 performs a command reception process. Because of the write access request of non-continuous data, the CPU 11 starts the disk formatter 36 after the command reception process in response to the write access command request. The hard disk controller 13 issues a command end report (2') to the host.

In response to the start of the disk formatter 36, the hard disk controller 13 generates a parity and performs a data write operation on the magnetic disk 21. Subsequent to the data writing, the hard disk controller 13 issues an interrupt to the CPU 11 again.

After the data reception process, the CPU 11 registers the write data in the buffer RAM 14.

The hard disk controller 13 issues an interrupt to the CPU 11 again subsequent to the write process to the magnetic disk 21. The CPU 11 starts a seek operation and reports the result of the seek operation to the hard disk controller 13.

(2) Access Request of Data of Large Amount Such as Video Data

When the blank area is registered as an unused area in the file system managed in the host, an access is performed on that area (as already discussed).

When a write access request for writing data of a large amount such as video data is placed, that request is rejected at one time. The use of that area is expected at a next write access.

The host, compatible with the hard disk drive executing the above operation, updates the designation of the LBA to the area expecting the access, and places a write access request again.

The host, incompatible with the hard disk drive executing the above operation, repeats a write access request to the same LBA regardless of the report from the disk drive. The disk drive performs the access operation as requested by the host.

Figure 22:
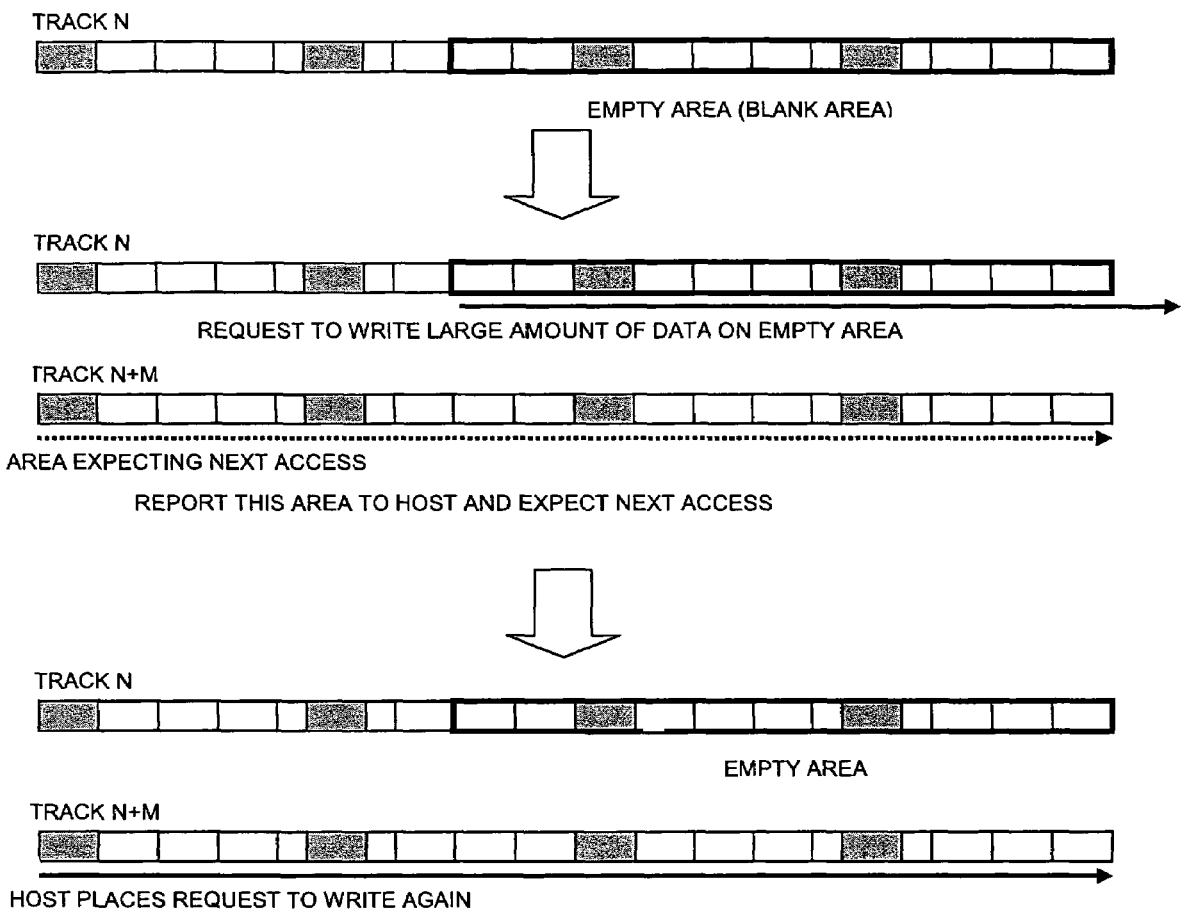
FIG. 22 illustrates a data write operation performed in response to a write request for data of a large amount in a blank area.

FIG. 22 illustrates a data write operation performed in response to a write request for data of a large amount in a blank area.

The file system in the host manages the unused area in the magnetic disk 21. Referring to FIG. 22, the host is assumed to issue a write access to an area registered in the file system as a blank area on the track N. Since the write access is intended to write data of a large amount such as video data, the hard disk drive rejects the write request on the blank area on the track N. The hard disk drive then reports to the host another track (track N+M as shown) as an area expecting a next access. The track N+M expecting an access, subsequent to the track N, is a track having an LBA continuous from the trailing LBA of the track N.

The host, compatible with the hard disk drive executing the above operation, updates the designation of the LBA to the area expecting the access, and places a write access request again.

Figure 23:
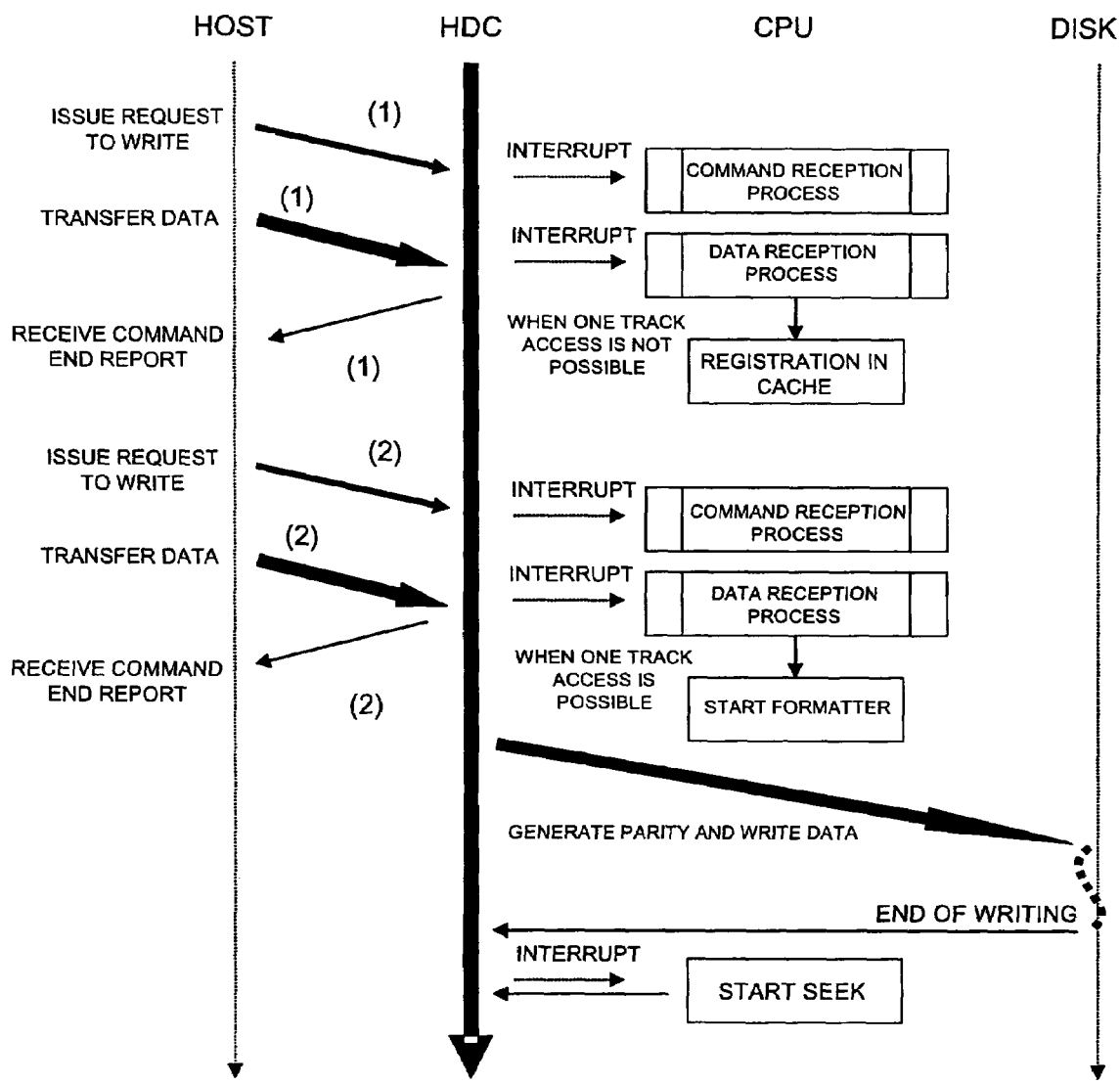
FIG. 23 illustrates a flow of a process of continuous accesses for data of a large amount such as video data.

FIG. 23 illustrates a flow of a process of continuous accesses for data of a large amount such as video data.

When a write access command (1) is issued from the host, the hard disk controller 13 receives the write access command through the interface 17, and interrupts the CPU 11. In response, the CPU 11 performs a command reception process.

When data is then transmitted from the host (1), the hard disk controller 13 receives the data through the interface 17, and interrupts the CPU 11. In response, the CPU 11 performs a data reception process.

When an access to one track is not possible, the write data is stored in the buffer RAM 14 as a cache. The hard disk controller 13 issues a command end report (for normal ending) (1) to the host.

When the write access request and data transfer are performed in the continued LBA, the same registration in the cache is repeatedly performed as long as the amount of data registered in the buffer RAM 14 fails to reach the access of one track.

When the amount of data registered in the buffer RAM 14 reaches the access of one track through the continued operation of the write access request (2) and the data transfer (2) in the consecutive LBAs, the CPU 11 starts the disk formatter 36 after the command reception process responsive to the write access request command and the data reception process responsive to the data transfer. The hard disk controller 13 issues a command end report (for normal ending) (2) to the host.

The hard disk controller 13 generates a parity and executes a data write operation to the magnetic disk 21 in response to the start of the disk formatter 36. The hard disk controller 13 interrupts the CPU 11 again subsequent to the end of the writing. The CPU 11 performs a seek operation, and notifies the hard disk controller 13 of the result of the seek operation.

The CPU 11 determines in the above operational sequence whether or not the access to one track is possible because the disk drive does not support the file system of the host. The access by the file system of the host may be used to check to see if the track falls within the range of access.

B-3-3. Operation of the Hard Disk Drive

The operation of the hard disk drive in the operational sequences illustrated in FIGS. 21 and 23 is actually carried by the CPU 11 in the hard disk drive when the CPU 11 reads and executes micro codes stored in the ROM 12, or by the hard disk controller 13 when the hard disk controller 13 executes a built-in logic.

The internal operation of the hard disk drive in the second embodiment will now be discussed.

The hard disk drive performs the command reception process in response to the write access request command from the host. In the command reception process, the hard disk drive performs determination about the continuous access and the empty area (the blank area). If the cache data currently present in the buffer RAM 14 is effective, and if the request range of the received command indicates an LBA succeeding to the command, the access is determined as a continuous access.

Figure 24:
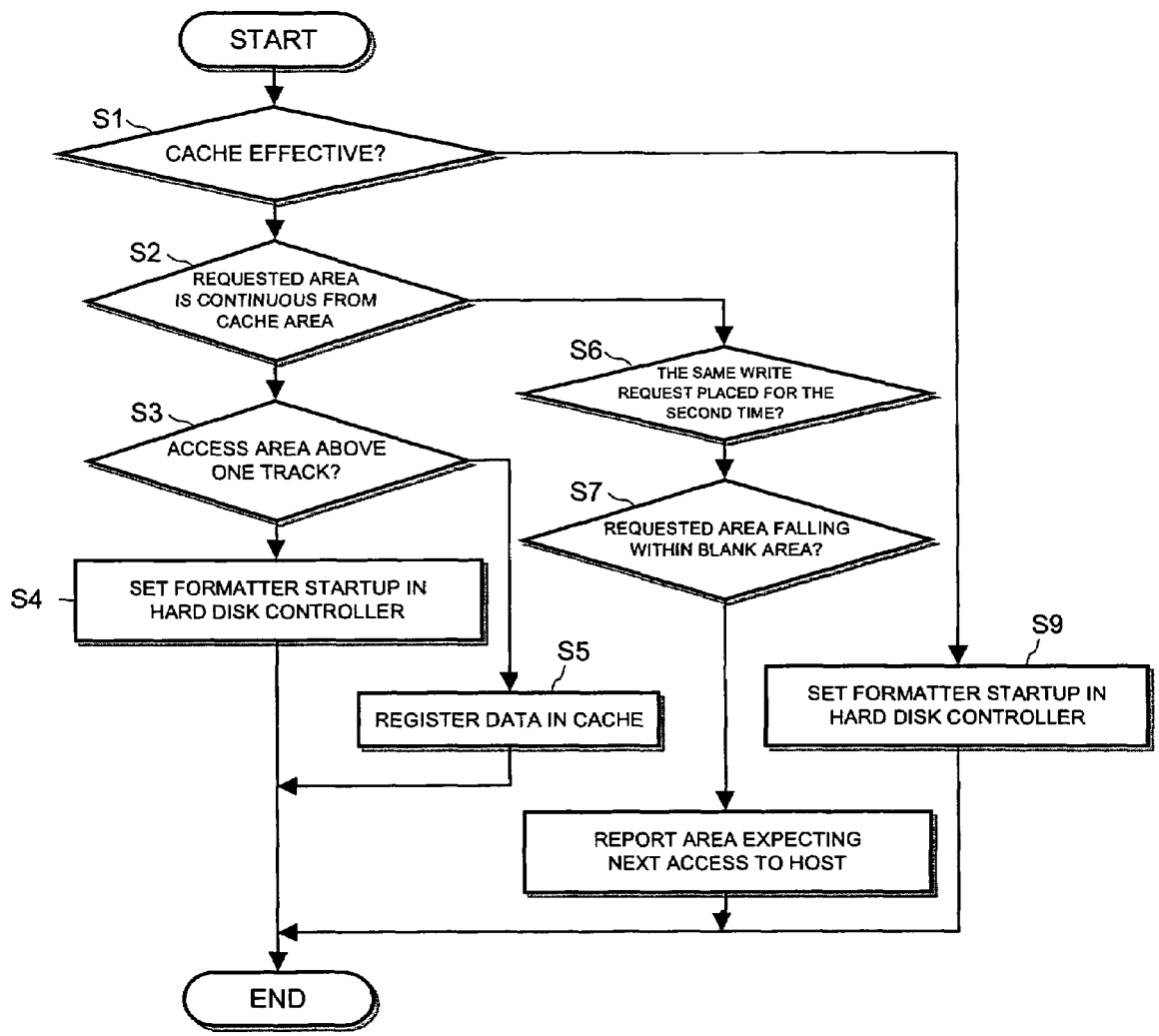
FIG. 24 is a flow diagram of a command reception process on the hard disk drive.

FIG. 24 is a flow diagram of the command reception process on the hard disk drive.

The hard disk drive checks whether to perform a write with the cache effective (a write operation to the magnetic disk 21) (step S1).

If the cache is effective, the hard disk drive checks to see if the request range of the received command indicates an LBA succeeding to the cache (step S2).

If the write request range is continuous from the cache, the hard disk drive checks to see if the access range exceeds one track (step S3).

If the access range does not exceed one track, the hard disk drive registers the data requested to write in the buffer RAM 14 as a cache (step S5), and ends the routine of the process. If the access range exceeds one track, the hard disk controller 13 sets the startup of the disk formatter 36 (step S4), and ends the process routine.

If the hard disk drive determines that the cache is not effective, the hard disk controller 13 sets the startup of the disk formatter 36 (step S9), performs a data write operation in the same way as a conventional hard disk drive (see FIG. 20), and ends the process routine.

If the hard disk drive determines in step S2 that the request range of the received command indicates no continuous LBA, in other words, determines a non-continuous access, the hard disk drive checks whether the same write request is placed for the second time (step S6). If it is determined that the same write request is placed for the second time, the host is considered to be incompatible with the hard disk drive of the present invention. The hard disk controller 13 sets the startup of the disk formatter 36 (step S9), performs a data write operation in the same way as a conventional hard disk drive (see FIG. 20), and ends the process routine.

If the same write request is not placed for the second time, the hard disk drive checks whether or not the write data falls within the range of the blank area (step S7). If it is determined that the write data falls within the range of the blank area, the hard disk controller 13 sets the startup of the disk formatter 36 (step S9), performs a data write operation in the same way as a conventional hard disk drive (see FIG. 20), and ends the process routine.

If it is determined in step S7 that the write data does not fall within the range of the blank area, the hard disk drive reports to the host an area expecting a next access (see FIG. 19 and FIG. 20) (step S8), and ends the process routine.

The CPU 11 starts the seek operation in response to the generation of the parity and the end of the data write operation to the magnetic disk 21. During the seek operation, the track skew table (see Table 2) is referenced, and a physical position of a next access start sector is determined. The timing at which the data is written onto the disk from the start of the formatter is at the moment the access of one track in response to a next write request becomes possible. The seek time is typically predominant, and the data of one track is written subsequent to the seek operation. It is not necessary to prepare all data in advance. It is sufficient that all data is prepared in the middle of the write operation.

Figure 25:
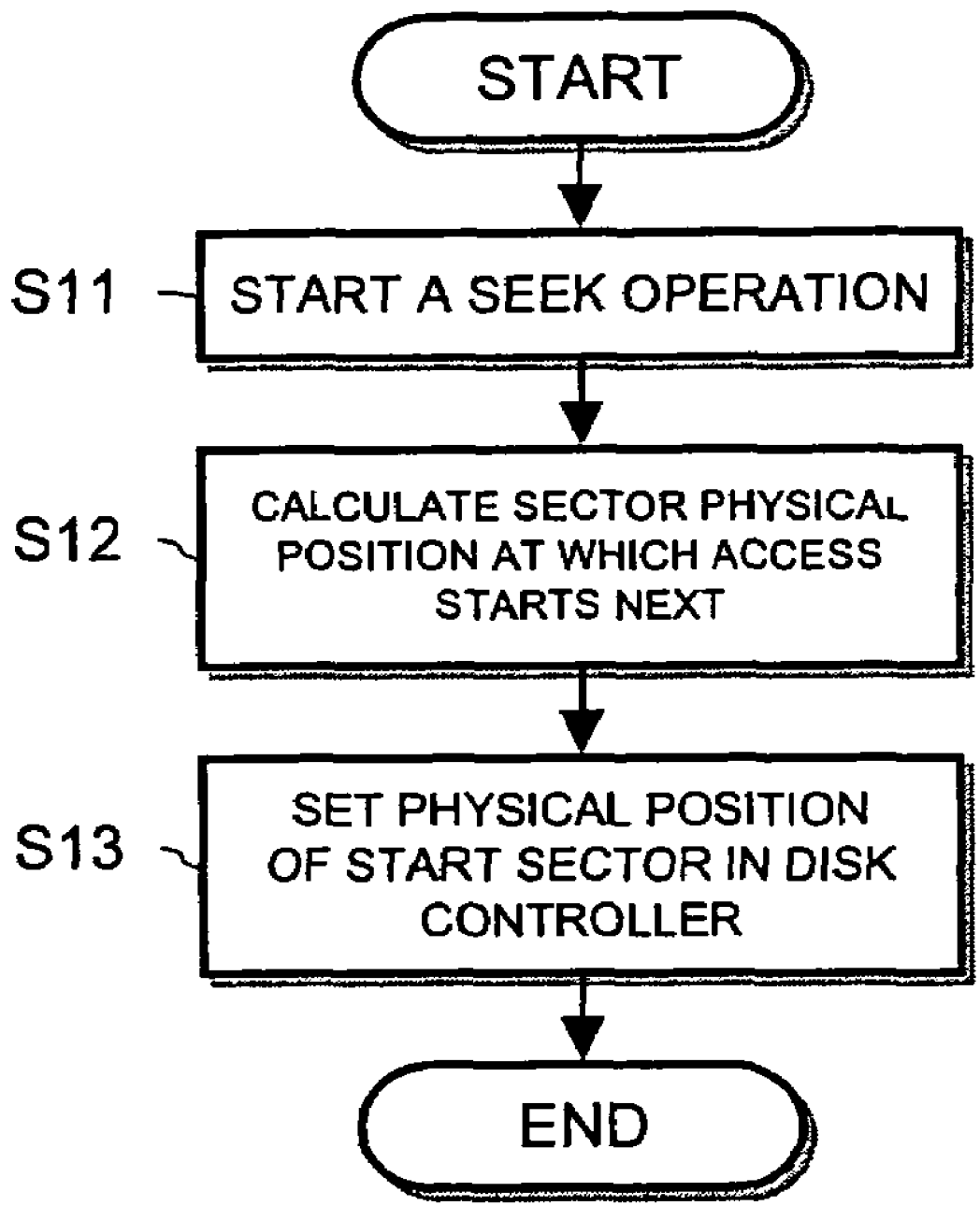
FIG. 25 is a flow diagram of a seek operation.
Figure 26:
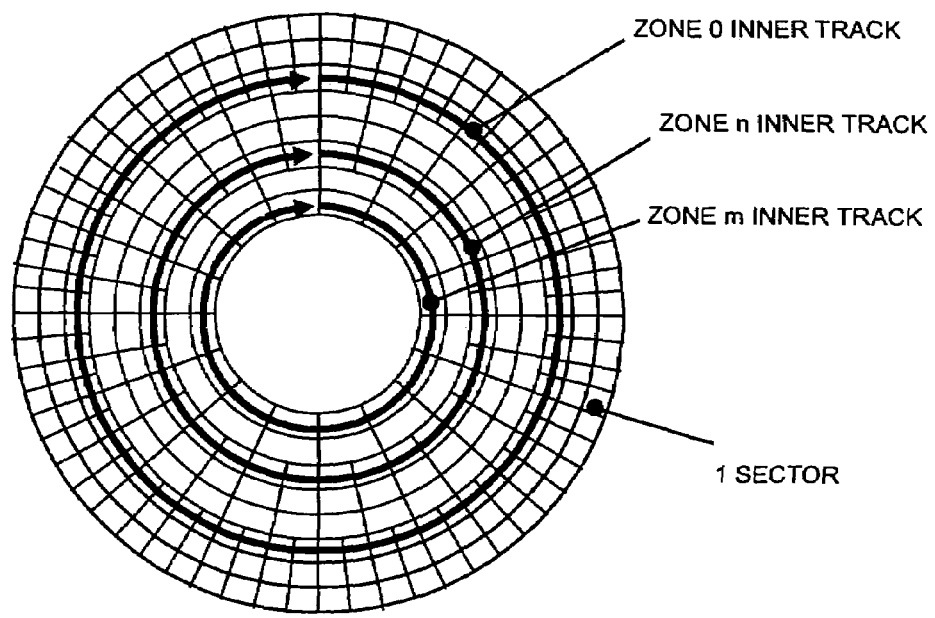
FIG. 26 diagrammatically illustrates a (conventional) structure of a hard disk.
Figure 27:
FIG. 27 diagrammatically illustrates a (conventional) structure of one track.

FIG. 25 is a flow diagram of a seek operation.

The seek operation is started (step S11), and the physical position of the sector to be accessed next is calculated (step S12).

The physical position of the sector is determined by adding the servo area number with which the access starts to the track skew table.

The physical position of the start sector is set in the hard disk controller 13 (step S13), and the process routine ends.

Appendix

The present invention has been discussed with reference to the particular embodiments. It is obvious that those skilled in the art modify and change the embodiments of the present invention without departing from the scope of the present invention. The embodiments of the present invention has been discussed for exemplary purposes only and are not intended to limit the scope of the present invention. The scope of the present invention is solely determined by the appended claims.

INDUSTRIAL APPLICABILITY

The present invention provides an excellent data access control apparatus, a data access control method, a controller, and a computer program for reducing an access time to a desired data storage location.

The present invention also provides an excellent data access control apparatus, a data access control method, a controller, and a computer program, free from the generation of a search time and free from a delay in a seek startup due to a useless read-ahead operation.

The present invention provides an excellent data access control apparatus, a data access control method, a controller, and a computer program, for reducing a seek time and a search time during a random access by improving a data structure on a disk as a medium and a disk access method.

The present invention provides an excellent data access control apparatus, a data access control method, a controller, and a computer program for making uniform the seek time of the track during the continuous access operation and minimizing the search time by allocating the logical block addresses to the sectors so that the seek time covers a plurality of track seeks within a range that the seek time does not exceed the search time.

The present invention provides an excellent data access control apparatus, a data access control method, a controller, and a computer program for achieving an appropriate sector arrangement by changing the sector arrangement on the track depending on disk drive individual differences and a drive operational status.

The invention claimed is:

1. A data access control apparatus for controlling access to a disk-type recording medium that includes a plurality of substantially concentric tracks, with each track divided into a plurality of sectors, the control apparatus comprising:
    seek means for seeking a target track; and
    data access means for accessing the sectors of the target track in an order that is not based on a target sector or a predetermined sector location, but starts with a start sector that is the first sector that becomes physically accessible to the data access means on the target track after the seeking of the target track is completed.

2. A data access control apparatus according to claim 1, wherein, during a write access, the data access means successively allocates relative position addresses to the sectors on the track in the order starting with the sector where the access operation has started.

3. A data access control apparatus according to claim 2, wherein, during a read access, the data access means repositions data read from the sectors on the track in accordance with the relative position addresses, thereby reproducing the written data.

4. A data access control apparatus according to claim 2, further comprising error correction means which generates an error correction code for error correcting data and error corrects the data in accordance with the error correction code, wherein, during a write access, the data access means writes, on each sector, the relative position address, the body of the data, and the error correction code which covers within an error correction range thereof the relative position address, the data body, and the error code.

5. A data access control apparatus according to claim 2, further comprising error correction means which generates an error correction code for error correcting data and error corrects the data in accordance with the error correction code, wherein, during a write access, the data access means on each sector, the body of the data, the relative position address, and the error correction code which covers within an error correction range thereof the data body, and the error code.

6. A data access control apparatus according to claim 5, wherein, during a read access, the data access means repositions the data based on the relative position address into which the error correction means error corrects the data read from each sector when the data is reproduced.

7. A data access control apparatus according to claim 1, wherein servo areas are arranged at predetermined intervals on the track, each sector has a fixed length, and each of several sectors straddles the servo area, and
    wherein the data access means treats, as an accessible start sector, a sector which is provided without straddling the servo area on the target track.

8. A data access control apparatus according to claim 1, wherein servo areas are arranged at predetermined intervals on the track, each sector has a variable length, and none of the sectors is designed to straddle the servo area, and
    wherein the data access means treats, as an accessible start sector, a sector which is immediately subsequent to a servo area on the target track.

9. A data access control apparatus according to claim 1, wherein a zone bit recording method having the number of sectors per track changing with a radial position across the recording medium is adopted.

10. A data access control apparatus according to claim 1, further comprising second data access means which accesses sectors in accordance with absolute position addresses of a track and a sector,
   wherein the storage area of the disk-type recording medium is divided into two partitions, with one partition where the data access means accesses the sectors of the target track in the order starting with a start sector that becomes accessible and the other partition where the second data access means accesses the sectors based on the absolute position addresses of the track and the sector.

11. A data access control apparatus for controlling access to a disk-type recording medium that includes a plurality of substantially concentric tracks, with each track divided into a plurality of sectors, the control apparatus comprising:
   seek means for seeking a target track;
   data access means for accessing the sectors on the target track;
   determining means for determining a relationship between a seek time and a seek distance of the track to be accessed by the data access means; and
   data write control means for allocating logical block addresses to the sectors during data writing so that, even if the seek time includes a plurality of track seeks, the seek time does not exceed a search time, given the determined relationship between the seek time and the seek distance,
   wherein the search time is the time required to access a given sector on the target track after seeking of the track is completed.

12. A data access control apparatus according to claim 11, wherein the determining means for determining the relationship between the seek time and the seek distance performs a seek operation on a disk drive with the seek distance changing, and measures the seek time thereby determining the relationship between the seek time and the seek distance.

13. A data access control apparatus for controlling access to a disk-type recording medium that includes a plurality of substantially concentric tracks, with each track divided into a plurality of sectors, the control apparatus comprising:
   seek means for seeking a target track;
   data access means for performing an access operation on the target track; and
   data write control means for treating, as an access start sector, a sector immediately subsequent to an on-track servo area during data writing.

14. A data access control apparatus for controlling access to a disk-type recording medium that includes a plurality of substantially concentric tracks, with each track divided into a plurality of sectors, the control apparatus comprising:
   seek means for seeking a target track;
   data access means for accessing the sectors of the target track in an order that is not based on a target sector or a predetermined sector location, but starts with a start sector that is the first sector that becomes physically accessible to the data access means on the target track after the seeking of the target track is completed;
   command receiving means for receiving a write request command;
   data receiving means for receiving write data;
   a cache which temporarily stores the received data; and
   data write control means for controlling a write operation of writing data onto the recording medium,
   wherein the data write control means causes the data access means to initiate a write access of one track if the area of the data requested to write is continuous from the data stored in the cache, and if an access range exceeds one track.

15. A data access control apparatus according to claim 14, wherein the data write control means registers the data requested to write in the cache if the area of the data requested to write is continuous from the data stored in the cache, but if the access range does not exceed one track.

16. A data access control apparatus according to claim 14, wherein the data write control means writes data in response to a second issue of the same write request command if the area of the data requested to write is not continuous from the data stored in the cache.

17. A data access control apparatus according to claim 14, wherein the data write control means reports to a write requesting source an area expecting a next access if the area of the data requested to write is not continuous from the data stored in the cache and if write data fails to fall within the area of the data requested to write.

18. A data access control method for controlling access to a disk-type recording medium that includes a plurality of substantially concentric tracks, with each track divided into a plurality of sectors, comprising:
   a seek step of seeking a target track; and
   a data access step of accessing the sectors of the target track in an order that is not based on a target sector or a predetermined sector location, but starts with a start sector that is the first sector that becomes physically accessible to a data access means on the target track after the seeking of the target track is completed.

19. A data access control method according to claim 18, wherein, during a write access, the data access step comprises successively allocating relative position addresses to the sectors on the track in the order starting with the sector where the access operation has started.

20. A data access control method according to claim 19, wherein, during a read access, the data access step comprises repositioning data read from the sectors on the track in accordance with the relative position addresses to reproduce the written data.

21. A data access control method according to claim 19, further comprising an error code generating step of generating an error correction code which covers the relative position address of the sector, the body of data, and the error correction code within an error correction range, wherein, during a write access, the data access step writes, on each sector, the relative position address, the data body, and the error correction code.

22. A data access control method according to claim 19, further comprising an error code generating step of generating an error correction code which covers the relative position address of the sector, the body of data, and the error correction code within an error correction range, wherein, during a write access, the data access step writes, on each sector, the data body, and the error correction code.

23. A data access control method according to claim 22, wherein, during a read access, the data access step comprises repositioning the data based on the relative position address into which the error correction step corrects the data read from each sector when the data is reproduced.

24. A data access control method according to claim 18, wherein servo areas are arranged at predetermined intervals on the track, each sector has a fixed length, and each of several sectors straddles the servo area, and
   wherein the data access step comprises treating, as an accessible start sector, a sector which is provided without straddling the servo area on the target track.

25. A data access control method according to claim 18, wherein servo areas are arranged at predetermined intervals on the track, each sector has a variable length, and none of the sectors is designed to straddle the servo area, and
wherein the data access step comprises treating, as an accessible start sector, a sector which is immediately subsequent to a servo area on the target track.

26. A data access control method according to claim 18, wherein a zone bit recording method having the number of sectors per track changing with a radial position across the recording medium is adopted.

27. A data access control method according to claim 18, further comprising a second data access step of accessing sectors in accordance with absolute position addresses of a track and a sector,
wherein the storage area of the disk-type recording medium is divided into two partitions, with one partition where the data access step accesses the sectors of the target track in the order starting with a start sector that becomes accessible and the other partition where the second data access step accesses the sectors based on the absolute position addresses of the track and the sector.

28. A data access control method for controlling access to a disk-type recording medium that includes a plurality of substantially concentric tracks, with each track divided into a plurality of sectors, comprising:
a seek step of seeking a target track;
a data access step of accessing the sectors of the target track;
a determining step of determining a relationship between a seek time and a seek distance of the track to be accessed in the data access step; and
a data write control step of allocating logical block addresses to the sectors during data writing so that, even if the seek time includes a plurality of track seeks, the seek time does not exceed a search time, given the determined relationship between the seek time and the seek distance,
wherein the search time is the time required to access a given sector on the target track after seeking of the track is completed.

29. A data access control method according to claim 28, wherein the determining step of determining the relationship between the seek time and the seek distance comprises performing a seek operation on a disk drive with the seek distance changing, and measures the seek time to determine the relationship between the seek time and the seek distance.

30. A data access control method for controlling access to a disk-type recording medium that includes a plurality of substantially concentric tracks, with each track divided into a plurality of sectors, comprising:
a seek step of seeking a target track;
a data access step of performing an access operation on the target track; and
a data write control step of treating, as an access start sector, a sector immediately subsequent to an on-track servo area during data writing.

31. A data access control method for controlling access to a disk-type recording medium that includes a plurality of substantially concentric tracks, with each track divided into a plurality of sectors, comprising:
a seek step of seeking a target track;
a data access step of accessing the sectors of the target track in an order that is not based on a target sector or a predetermined sector location, but starts with a start sector that is the first sector that becomes physically accessible to a data access means on the target track after the seeking of the target track is completed;
a command receiving step of receiving a write request command;
a data receiving step of receiving write data;
a storing step of storing temporarily the received data in a cache; and
a data write control step of controlling a write operation of writing data onto the recording medium,
wherein the data write control step comprises initiating a write access of one track if the area of the data requested to write is continuous from the data stored in the cache, and if an access range exceeds one track.

32. A data access control method according to claim 31, wherein the data write control step comprises registering the data requested to write in the cache if the area of the data requested to write is continuous from the data stored in the cache, but if the access range does not exceed one track.

33. A data access control method according to claim 31, wherein the data write control step comprises writing data in response to a second issue of the same write request command if the area of the data requested to write is not continuous from the data stored in the cache.

34. A data access control method according to claim 31, wherein the data write control step comprises reporting to a write requesting source an area expecting a next access if the area of the data requested to write is not continuous from the data stored in the cache and if write data fails to fall within the area of the data requested to write.

35. A controller for controlling an operation of a disk-type recording apparatus which seeks a track to access data on a data surface of a disk having a plurality of substantially concentric tracks, with each track divided into a plurality of sectors, comprising:
means for issuing a command to seek a target track; and
means for issuing a command to access the sectors of the target track in an order that is not based on a target sector or a predetermined sector location, but starts with a start sector that is the first sector that becomes physically accessible to a data access means on the target track after the seeking of the target track is completed.

36. A controller for controlling an operation of a disk-type recording apparatus which seeks a track to access data on a data surface of a disk having a plurality of substantially concentric tracks, with each track divided into a plurality of sectors, comprising:
means for issuing a command to seek a target track;
means for issuing a command to access the data on the target track;
means for determining a relationship between a seek distance and a seek time of the target track; and
data write control means which allocates logical block addresses to the sectors during data writing so that, even if the seek time includes a plurality of track seeks, the seek time does not exceed a search time, given the determined relationship between the seek time and the seek distance,
wherein the search time is the time required to access a given sector on the target track after seeking of the track is completed.

37. A controller for controlling an operation of a disk-type recording apparatus which seeks a track to access data on a data surface of a disk having a plurality of substantially concentric tracks, with each track divided into a plurality of sectors, comprising:
means for issuing a command to seek a target track;

means for issuing a command to access data on the target track; and data write control means which treats, as an access start sector, a sector immediately subsequent to an on-track servo area during data writing.

38. A controller for controlling an operation of a disk-type recording apparatus which seeks a track to access data on a data surface of a disk having a plurality of substantially concentric tracks, with each track divided into a plurality of sectors, comprising:

seek means for seeking a target track;

data access means for accessing the sectors of the target track in an order that is not based on a target sector or a predetermined sector location, but starts with a start sector that is the first sector that becomes physically accessible to the data access means on the target track after the seeking of the target track is completed;

command receiving means which receives a write request command;

data receiving means which receives write data;

a cache which temporarily stores the received data; and means for issuing a write access command for one track if the area of the data requested to write is continuous from the data stored in the cache, and if an access range exceeds one track.

39. A computer program embedded on a computer-readable medium and configured to cause a computer system to control access to a disk-type recording medium that includes a plurality of substantially concentric tracks, with each track divided into a plurality of sectors, comprising:

a seek step of seeking a target track; and an access step of accessing sectors of one track in an order that is not based on a target sector or a predetermined sector location, but starts with a start sector that is the first sector that becomes physically accessible to a data access means on the target track after the seeking of the target track is completed.

40. A computer program embedded on a computer-readable medium and configured to cause a computer system to control access to a disk-type recording medium that includes a plurality of substantially concentric tracks, with each track divided into a plurality of sectors, comprising:

a seek step of seeking a target track;

an access step of accessing the data on the target track;

a determining step of determining a relationship between a seek distance and a seek time of the track; and a data write control step of allocating logical block addresses to the sectors during data writing so that, even if the seek time includes a plurality of track seeks, the seek time does not exceed a search time, given the determined relationship between the seek time and the seek distance, wherein the search time is the time required to access a given sector on the target track after seeking of the track is completed.

41. A computer program embedded on a computer-readable medium and configured to cause a computer system to control access to a disk-type recording medium that includes a plurality of substantially concentric tracks, with each track divided into a plurality of sectors, comprising:

a seek step of seeking a target track;

an access step of accessing data on the target track; and a data write control step of treating, as an access start sector, a sector immediately subsequent to an on-track servo area during data writing.

42. A computer program embedded on a computer-readable medium and configured to cause a computer system to control access to a disk-type recording medium that includes a plurality of substantially concentric tracks, with each track divided into a plurality of sectors, comprising:

a seek step of seeking a target track;

a data access step of accessing the sectors of the target track in an order that is not based on a target sector or a predetermined sector location, but starts with a start sector that is the first sector that becomes physically accessible to a data access means on the target track after the seeking of the target track is completed;

a command receiving step of receiving a write request command;

a data receiving step of receiving write data;

a storing step of temporarily storing the received data in a cache; and a data write control step of controlling a write operation of writing data to the recording medium, wherein the data write control step comprises starting a write access command for one track if the area of the data requested to write is continuous from the data stored in the cache, and if an access range exceeds one track.

* * * * *